(12) United States Patent
Kobayashi et al.

(10) Patent No.: US 12,519,677 B2
(45) Date of Patent: Jan. 6, 2026

(54) COMMUNICATION DEVICE, COMMUNICATION SYSTEM, AND COMMUNICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Nobuyuki Kobayashi, Yokkaichi (JP); Makoto Mashita, Yokkaichi (JP); Masakatsu Moriguchi, Yokkaichi (JP); Takeshi Hagihara, Yokkaichi (JP); Ryo Yamane, Osaka (JP); Ichiro Kanda, Osaka (JP); Tatsuya Izumi, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 34 days.

(21) Appl. No.: 18/294,643

(22) PCT Filed: Jun. 28, 2022

(86) PCT No.: PCT/JP2022/025740
§ 371 (c)(1),
(2) Date: Feb. 2, 2024

(87) PCT Pub. No.: WO2023/013304
PCT Pub. Date: Feb. 9, 2023

(65) Prior Publication Data
US 2024/0348473 A1    Oct. 17, 2024

(30) Foreign Application Priority Data

Aug. 5, 2021 (JP) .................... 2021-129095

(51) Int. Cl.
*H04L 12/403* (2006.01)
*H04L 12/40* (2006.01)

(52) U.S. Cl.
CPC ...... *H04L 12/403* (2013.01); *H04L 12/40006* (2013.01)

(58) Field of Classification Search
CPC ............ H04L 12/403; H04L 12/40006
See application file for complete search history.

(56) References Cited

U.S. PATENT DOCUMENTS 5,912,895 A    6/1999    Terry et al.
5,923,856 A    7/1999    Hazama et al.
(Continued)

FOREIGN PATENT DOCUMENTS

JP    2016-123054 A    7/2016
JP    2016-213653 A    12/2016

OTHER PUBLICATIONS

Japanese Office Action, Application No. 2021-129095, mailed Sep. 24, 2024.
(Continued)

*Primary Examiner* — Henry Tsai
*Assistant Examiner* — Aurangzeb Hassan
(74) *Attorney, Agent, or Firm* — Honigman LLP

(57) ABSTRACT

A communication device includes: a data transmission unit that is connected to a communication bus to which a plurality of communication equipments are connected and transmits data; and a processing unit that performs processing. The order in which the plurality of pieces of communication equipment and the data transmission unit transmit data through the communication bus is determined in advance. A start signal indicating the start of data transmission is repeatedly transmitted through the communication bus. The data transmission unit transmits data according to (Continued)

the order when the start signal is transmitted. The processing unit changes the transmission interval of the start signal.

15 Claims, 18 Drawing Sheets

(56) References Cited

U.S. PATENT DOCUMENTS

| | | | | |
|---|---|---|---|---|
| 12,289,387 | B2* | 4/2025 | Fitzgerald | H04L 7/0004 |
| 2006/0089138 | A1* | 4/2006 | Smith | H04W 52/0229 |
| | | | | 455/426.1 |
| 2012/0057620 | A1* | 3/2012 | Yamamoto | H04W 48/10 |
| | | | | 375/259 |
| 2019/0158310 | A1* | 5/2019 | Hustava | H04L 12/40019 |
| 2019/0363991 | A1 | 11/2019 | Sostawa et al. | |
| 2020/0076713 | A1* | 3/2020 | Meyer | H04L 69/22 |
| 2020/0104270 | A1* | 4/2020 | Poezart | G06F 13/387 |
| 2020/0136857 | A1* | 4/2020 | Yun | H04L 12/40039 |
| 2020/0195450 | A1* | 6/2020 | Bains | G06F 13/1668 |
| 2020/0213148 | A1* | 7/2020 | Sano | H04L 12/4015 |
| 2020/0274734 | A1* | 8/2020 | Antonsson | H04L 1/0083 |
| 2021/0377343 | A1* | 12/2021 | Kim | H04L 12/4035 |
| 2022/0166644 | A1* | 5/2022 | Ngo | H04L 25/4902 |
| 2023/0106494 | A1* | 4/2023 | Yang | H04B 3/548 |
| | | | | 307/82 |

OTHER PUBLICATIONS

International Search Reported issued in PCT/JP2022/025740, mailed Oct. 4, 2022.

\* cited by examiner

B: beacon signal
D: data frame

| | ID | roles | transmission turns |
|---|---|---|---|
| First ECU | 001 | master | first |
| Second ECU | 002 | slave | second |
| Second ECU | 003 | slave | third |
| Second ECU | 004 | slave | fourth |
| Second ECU | 005 | slave | fifth |

Legend:
A: Determines whether or not the waiting period indicated by the waiting period data has passed Legend:
A: determines whether or not the bit communicator 35 has received a beacon signal B: determines whether or not the turn to transmit the data frame has arrived C: determines whether or not the waiting period indicated by the waiting period data has passed

FIG. 11 when no data frame is transmitted

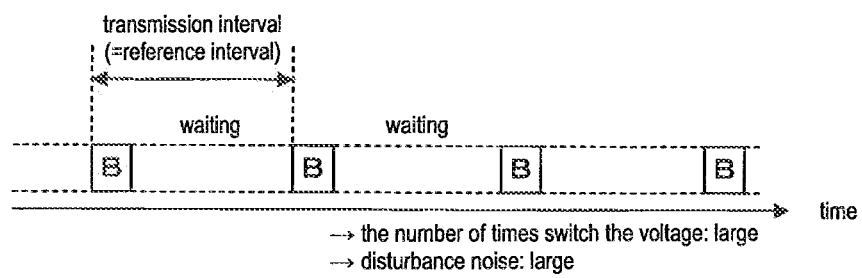

→ the number of times switch the voltage: large
→ disturbance noise: large

When some of the first ECU 11 and the plurality of second ECUs 12 transmit data frames

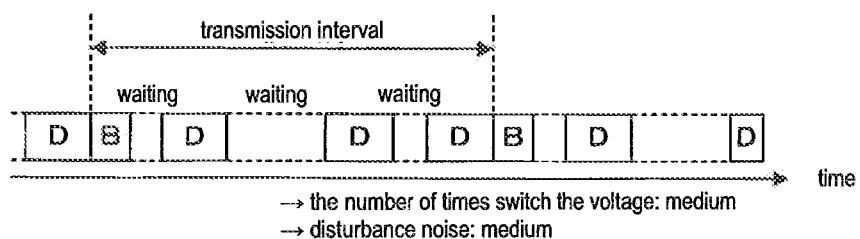

→ the number of times switch the voltage: medium
→ disturbance noise: medium

When all of the first ECU 11 and the plurality of second ECUs 12 transmit data frames

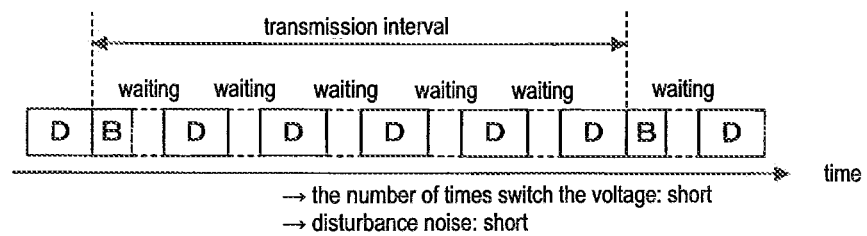

→ the number of times switch the voltage: short
→ disturbance noise: short

B: beacon signal
D: data frame

FIG. 12
when no data frame is transmitted
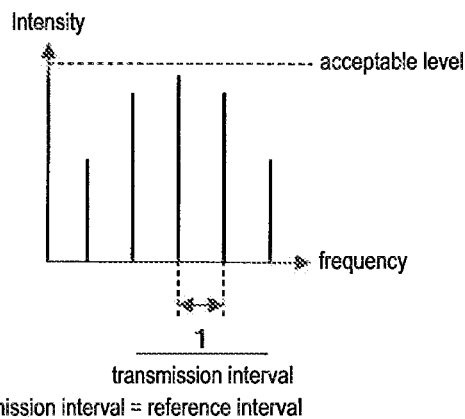
transmission interval = reference interval
When some of the first ECU 11 and the plurality of second ECUs 12 transmit data frames
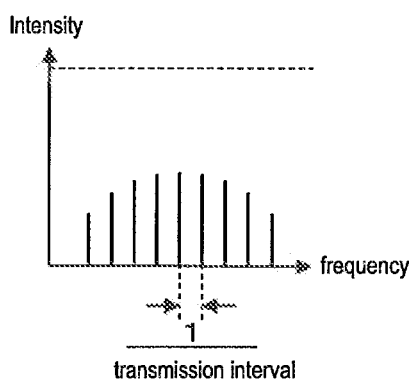
When some of the first ECU 11 and the plurality of second ECUs 12 transmit data frames
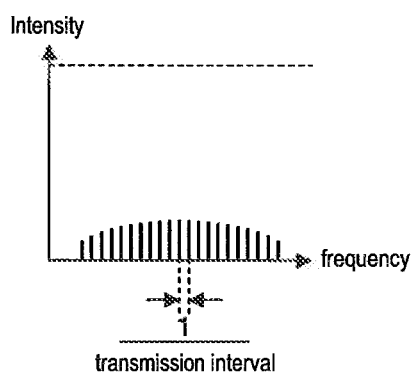

order data

|  | ID | roles | transmission turns |
|---|---|---|---|
| First ECU | 001 | master | first |
| Second ECU | 002 | slave | second |
| Second ECU | 003 | slave | third |
| Virtual ECU | 991 | slave | fourth |
| Virtual ECU | 992 | slave | fifth |
| Virtual ECU | 993 | slave | sixth |
| Virtual ECU | 994 | slave | seventh |

The virtual ECU: not exist
virtual ECUs do not transmit data frames
the first ECU 11 and the second ECUs 12 operate as if a virtual ECU exists

COMMUNICATION DEVICE, COMMUNICATION SYSTEM, AND COMMUNICATION METHOD

CROSS-REFERENCE TO RELATED APPLICATIONS

This application is the U.S. national stage of PCT/JP2022/025740 filed on Jun. 28, 2022, which claims priority of Japanese Patent Application No. JP 2021-129095 filed on Aug. 5, 2021, the contents of which are incorporated herein.

TECHNICAL FIELD

The present disclosure relates to a communication device, a communication system, and a communication method.

BACKGROUND

Japanese Patent Laid-Open Publication No. 2016-213653 discloses a communication system for vehicles in which a plurality of communication devices are connected to a communication bus. Each communication device transmits data to other communication devices through the communication bus.

Data is transmitted by adjusting the voltage of the communication bus each time one bit period passes. When the voltage of the communication bus changes, the current value of the current flowing through the communication bus changes, and electromagnetic waves are generated from the communication bus. In a vehicle, various signals are output through conducting wires different from the communication bus. Electromagnetic waves generated from the communication bus act as signal disturbance noise. If the intensity of the disturbance noise is high, the signal may not be read properly.

The present disclosure has been made in view of such circumstances, and it is an object of the present disclosure to provide a communication device, a communication system, and a communication method capable of preventing the generation of high-intensity disturbance noise.

Data is transmitted by adjusting the voltage of the communication bus each time one bit period passes. When the voltage of the communication bus changes, the current value of the current flowing through the communication bus changes, and electromagnetic waves are generated from the communication bus. In a vehicle, various signals are output through conducting wires different from the communication bus. Electromagnetic waves generated from the communication bus act as signal disturbance noise. If the intensity of the disturbance noise is high, the signal may not be read properly.

The present disclosure has been made in view of such circumstances, and it is an object of the present disclosure to provide a communication device, a communication system, and a communication method capable of preventing the generation of high-intensity disturbance noise.

SUMMARY

A communication device according to an aspect of the present disclosure includes: a data transmission unit that is connected to a communication bus to which a plurality of pieces of communication equipment (a plurality of communication equipments) are connected and transmits data; and a processing unit that performs processing. An order in which the plurality of pieces of communication equipment and the data transmission unit transmit data through the communication bus is determined in advance. A start signal indicating a start of data transmission is repeatedly transmitted through the communication bus. The data transmission unit transmits data according to the order when the start signal is transmitted. The processing unit changes a transmission interval of the start signal.

A communication system according to an aspect of the present disclosure includes a plurality of communication devices connected to a communication bus. One of the plurality of communication devices has a signal transmission unit that repeatedly transmits a start signal indicating a start of data transmission through the communication bus. Each of the plurality of communication devices includes a data transmission unit that transmits data through the communication bus according to a predetermined order when the start signal is transmitted. At least one of the plurality of communication devices further includes a processing unit that performs processing. The processing unit changes a transmission interval of the start signal.

A communication method according to an aspect of the present disclosure is a communication method of a communication device for transmitting data. The communication device is connected to a communication bus to which a plurality of pieces of communication equipment (a plurality of communication equipments) are connected. An order in which the communication device and the plurality of pieces of communication equipment transmit data through the communication bus is determined in advance. A start signal indicating a start of data transmission is repeatedly transmitted through the communication bus. The communication device executes: a step of transmitting data according to the order when the start signal is transmitted; and a step of changing a transmission interval of the start signal.

In addition, not only can the present disclosure be realized as a communication device including such a characteristic processing unit, but also the present disclosure can be realized as a communication method including such characteristic processes as steps or can be realized as a computer program causing a computer to execute such steps. In addition, the present disclosure can be realized as a semiconductor integrated circuit that realizes a part or the entirety of a communication device, or can be realized as a communication system including a communication device.

Effects of the Present Disclosure

According to the above aspect, it is possible to prevent the generation of high-intensity disturbance noise.

BRIEF DESCRIPTION OF DRAWINGS

FIG. 11 is an explanatory diagram showing the relationship between the transmission interval and disturbance noise.

FIG. 12 is another explanatory diagram showing the relationship between the transmission interval and disturbance noise.

DETAILED DESCRIPTION OF PREFERRED EMBODIMENTS

Figure 1:
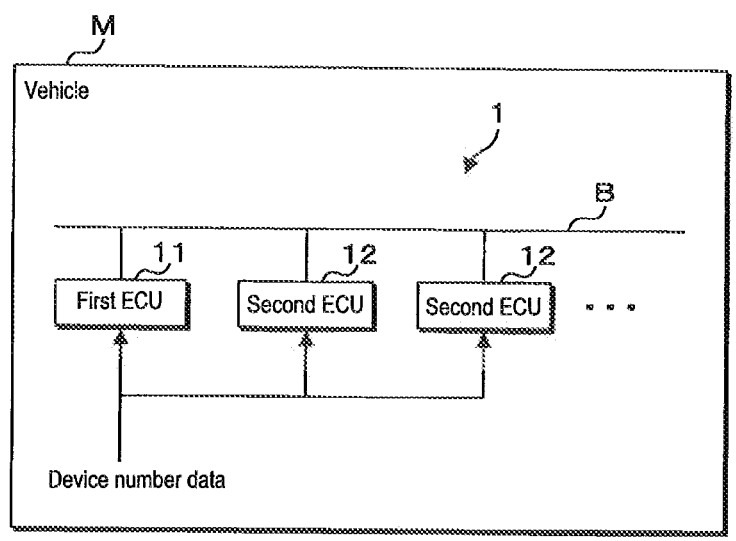
FIG. 1 is a block diagram showing the main configuration of a communication system according to a first embodiment.

First, embodiments of the present disclosure will be listed and described. At least some of the embodiments described below may be arbitrarily combined.

A communication device according to a first aspect of the present disclosure includes: a data transmission unit that is connected to a communication bus to which a plurality of pieces of communication equipment are connected and transmits data; and a processing unit that performs processing. An order in which the plurality of pieces of communication equipment and the data transmission unit transmit data through the communication bus is determined in advance. A start signal indicating a start of data transmission is repeatedly transmitted through the communication bus. The data transmission unit transmits data according to the order when the start signal is transmitted. The processing unit changes a transmission interval of the start signal.

According to the aspect described above, the start signal is transmitted by adjusting the voltage of the communication bus each time a period of one bit passes. When the voltage is changed, disturbance noise is generated. When the transmission interval of the start signal is short, the number of times the voltage of the communication bus is switched per unit time is large. Therefore, the intensity of the disturbance noise is large. The processing unit changes the transmission interval of the start signal. Therefore, the processing unit can prevent the generation of high-intensity disturbance noise.

In the communication device according to a second aspect of the present disclosure, the data transmission unit waits when a data transmission turn comes. The data transmission unit starts data transmission when a period taken for waiting is equal to or longer than a waiting period. The transmission interval of the start signal increases as the waiting period increases. The processing unit changes the transmission interval of the start signal by changing the waiting period.

According to the aspect described above, the processing unit changes the waiting period. Therefore, the transmission interval of the start signal is changed.

In the communication device according to a third aspect of the present disclosure, the processing unit acquires the number of devices connected to the communication bus from an outside, and changes the waiting period based on the acquired number of devices.

According to the aspect described above, for example, the reference interval of the transmission interval of the start signal is determined and set in advance. In this case, as one example, the processing unit subtracts a period required for transmitting the start signal from the reference interval. The processing unit divides a subtraction value obtained by the subtraction by the number of devices. For example, the processing unit changes the waiting period to a division value obtained by the division. For example, when a waiting period is set for all devices connected to the communication bus, the waiting period of each device is changed to the division value. At this time, even if all the devices do not transmit data, the transmission interval of the start signal is the reference interval. The transmission interval of the start signal is not less than the reference interval. For this reason, when the reference interval is long, high-intensity disturbance noise is not generated.

The communication device according to a fourth aspect of the present disclosure further includes a signal transmission unit that transmits the start signal through the communication bus. The signal transmission unit waits when last communication equipment having a last data transmission turn, among the plurality of pieces of communication equipment, ends data transmission or when the last communication equipment does not transmit data. The signal transmission unit transmits the start signal again when a period taken for waiting is equal to or longer than a second waiting period. The processing unit changes the transmission interval of the start signal by changing the second waiting period.

According to the aspect described above, the processing unit changes the second waiting period. Therefore, the transmission interval of the start signal is changed.

In the communication device according to a fifth aspect of the present disclosure, the processing unit acquires period data regarding the second waiting period from an outside, and changes the second waiting period based on the acquired period data.

According to the aspect described above, the processing unit changes the second waiting period based on the acquired period data.

In the communication device according to a sixth aspect of the present disclosure, the data transmission unit starts data transmission after elapse of a waiting period when the signal transmission unit ends transmission of the start signal. The processing unit acquires the period data indicating an integer exceeding the number of devices connected to the communication bus, and changes the second waiting period to a product of the waiting period and a numerical value obtained by subtracting the number of devices from the integer indicated by the period data.

According to the aspect described above, the processing unit changes the second waiting period to a value corresponding to the integer indicated by the period data.

In the communication device according to a seventh aspect of the present disclosure, the configuration of the data transmission unit conforms to 10BASE-T1S of IEEE802.3cg.

According to the aspect described above, the data transmission unit transmits a baseband signal having a data rate of 10 Mbps through the twisted pair wire.

A communication system according to an eighth aspect of the present disclosure includes a plurality of communication devices connected to a communication bus. One of the plurality of communication devices has a signal transmission unit that repeatedly transmits a start signal indicating a start of data transmission through the communication bus. Each of the plurality of communication devices includes a data transmission unit that transmits data through the communication bus according to a predetermined order when the start signal is transmitted. At least one of the plurality of communication devices further includes a processing unit that performs processing. The processing unit changes a transmission interval of the start signal.

According to the aspect described above, as described above, when the transmission interval of the start signal is short, the intensity of disturbance noise is large. One or more processing units included in one or more communication devices change the transmission interval of the start signal. Therefore, one or more processing units can prevent the generation of high-intensity disturbance noise.

In the communication system according to a ninth aspect of the present disclosure, the one or more processing units collectively change the transmission interval of the start signal to a value of 60 μs or more.

According to the aspect described above, since the transmission interval of the start signal is 60 μs or more, the generation of high-intensity disturbance noise due to the transmission interval of the start signal is prevented.

In the communication system according to a tenth aspect of the present disclosure, the one or more processing units collectively change the transmission interval of the start signal to a value of 6500 μs or less.

According to the aspect described above, since the transmission interval of the start signal is 6500 μs or less, the occurrence of communication delay due to the transmission interval of the start signal is prevented.

A communication method according to an eleventh aspect of the present disclosure is a communication method of a communication device for transmitting data. The communication device is connected to a communication bus to which a plurality of pieces of communication equipment are connected. An order in which the communication device and the plurality of pieces of communication equipment transmit data through the communication bus is set in advance. A start signal indicating a start of data transmission is repeatedly transmitted through the communication bus. The communication device executes: a step of transmitting data according to the order when the start signal is transmitted; and a step of changing a transmission interval of the start signal.

According to the aspect described above, as described above, when the transmission interval of the start signal is short, the intensity of disturbance noise is large. The communication device changes the transmission interval of the start signal. Therefore, the communication device can prevent the generation of high-intensity disturbance noise.

Specific examples of communication systems according to embodiments of the present disclosure will be described below with reference to the diagrams. In addition, the present disclosure is not limited to these examples but is defined by the claims, and is intended to include all modifications within the meaning and scope equivalent to the claims.

First Embodiment—Configuration of Communication System 1

FIG. 1 is a block diagram showing the main configuration of a communication system 1 according to a first embodiment. The communication system 1 is mounted in a vehicle M. The communication system 1 includes a first ECU 11 and a plurality of second ECUs 12. ECU is an abbreviation for Electronic Control Unit. The first ECU 11 and the plurality of second ECUs 12 are connected to a communication bus B.

Electrical equipment and sensors are connected to the first ECU 11 and the plurality of second ECUs 12. The electrical equipment and the sensors are not shown. Each sensor detects a value related to the vehicle, and outputs the detected detection value to the first ECU 11 or the second ECU 12 connected to the sensor. For example, when the detection value of the sensor is input, each of the first ECU 11 and the plurality of second ECUs 12 transmits a data frame including the detection value of the sensor as main data through the communication bus B. The data frame includes transmission destination data indicating a transmission destination. In addition, the main data is not limited to the detection value of the sensor. The data frame is data.

When one ECU connected to the communication bus B transmits a data frame, all ECUs connected to the communication bus B receive the data frame. When the data frame is received, each of the first ECU 11 and the plurality of second ECUs 12 discards the received data frame if the transmission destination of the data frame is not itself.

When the data frame is received, each of the first ECU 11 and the plurality of second ECUs 12 determines an operation, which is to be performed by electrical equipment connected to itself, based on the main data included in the received data frame if the transmission destination of the data frame is itself. When the operation to be performed by the electrical equipment is determined, each of the first ECU 11 and the plurality of second ECUs 12 outputs an operation signal indicating the determined operation to the electrical equipment. When the operation signal is input to the electrical equipment, the electrical equipment performs the operation indicated by the input operation signal.

Data Frame Transmission Method

Figure 2:
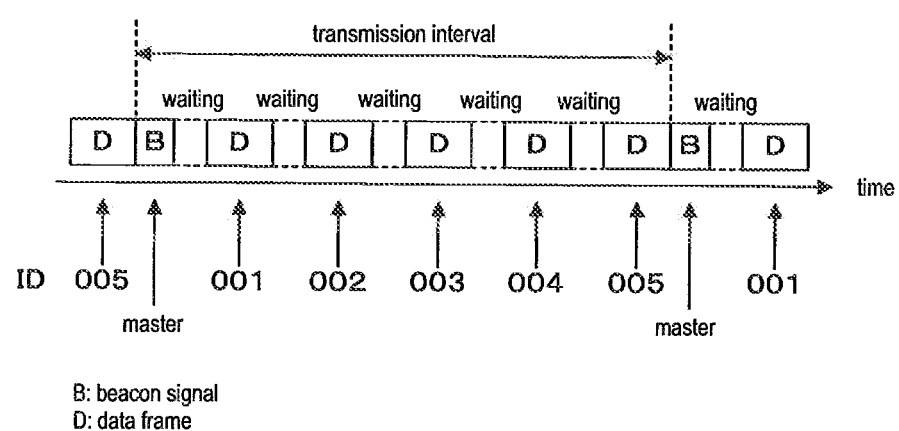
FIG. 2 is an explanatory diagram of a data frame transmission method.
Figures 3, 4:
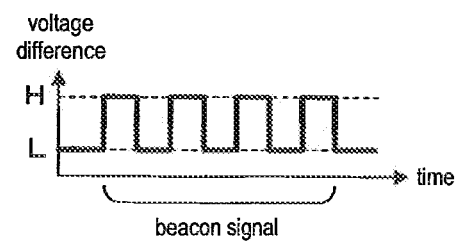
FIG. 3 is a chart showing the IDs, roles, and transmission turns of a first ECU and a plurality of second ECUs.
FIG. 4 is a waveform diagram of a beacon signal.

FIG. 2 is an explanatory diagram of a data frame transmission method. FIG. 3 is a chart showing the IDs, roles, and transmission turns of the first ECU 11 and the plurality of second ECUs 12. ID is an abbreviation for Identification Data. FIGS. 2 and 3 show an example in which the first ECU 11 and the four second ECUs 12 transmit data frames.

When another ECU transmits a data frame through the communication bus B while one ECU among the first ECU 11 and the plurality of second ECUs 12 is transmitting a data frame through the communication bus B, a plurality of data frames collide. If a plurality of data frames collide, the transmissions of the data frames fail. Therefore, in order to avoid the collision of a plurality of data frames, each of the first ECU 11 and the plurality of second ECUs 12 transmits a data frame according to a PLCA (Physical Layer Collision Avoidance) method.

As shown in FIG. 2, in the PLCA method, a beacon signal is repeatedly transmitted through the communication bus B. When the beacon signal is transmitted, five data frames are transmitted through the communication bus B. The beacon signal indicates the start of transmission of a data frame. The beacon signal corresponds to a start signal. The beacon signal is transmitted from an ECU serving as a master. As shown in FIG. 3, the first ECU 11 serves as a master. Therefore, the first ECU 11 repeatedly transmits the beacon signal through the communication bus B. Each of the plurality of second ECUs 12 serves as a slave.

When the first ECU 11 transmits a beacon signal, the first ECU 11 and the plurality of second ECUs 12 transmit data frames through the communication bus B. The order in which the first ECU 11 and the plurality of second ECUs 12 transmit data frames through the communication bus B is determined in advance. As shown in FIG. 3, an ID is assigned in advance to each of the first ECU 11 and the plurality of second ECUs 12. In the example of FIG. 3, the ID of the first ECU 11 is 001. One of 002 to 005 is assigned to each of the four second ECUs 12. In FIG. 3, the transmission turns of 001 to 005 are set to first to fifth. The transmission turn of the master is first.

The operations of the first ECU 11 and the four second ECUs 12 when each of the first ECU 11 and the four second ECUs 12 transmits data frames will be described. A common waiting period data indicating a waiting period is stored in each of the first ECU 11 and the four second ECUs 12.

When the first ECU 11 transmits a beacon signal, first, the first ECU 11 with an ID of 001 waits until the waiting period indicated by the waiting period data passes. The first ECU 11 transmits a data frame after the elapse of the waiting period. Then, the second ECU 12 with an ID of 002 waits until the waiting period indicated by the waiting period data passes from the end of the transmission of the data frame from the ECU having an immediately previous turn, that is, the first ECU 11. The second ECU 12 with an ID of 002 transmits a data frame after the elapse of the waiting period.

Then, the second ECU 12 with an ID of 003 waits until the waiting period indicated by the waiting period data passes from the end of the transmission of the data frame from the ECU having an immediately previous turn, that is, the second ECU 12 with an ID of 002. The second ECU 12 with an ID of 003 transmits a data frame after the elapse of the waiting period. Thereafter, each of the two second ECUs 12 corresponding to 004 and 005 transmits a data frame in the same manner as the second ECU 12 with an ID of 002 or 003. The first ECU 11 transmits the beacon signal again when the second ECU 12 having a last turn, that is, the second ECU 12 with an ID of 005, ends the transmission of the data frame. Each of the first ECU 11 and the second ECU 12 functions as a communication device or communication equipment.

When the first ECU 11 does not transmit a data frame, the second ECU 12 with an ID of 002 waits again until the waiting period passes after the elapse of the waiting period from the transmission of the beacon signal. If there is a data frame to be transmitted, the second ECU 12 with an ID of 002 transmits the data frame after the elapse of the waiting period.

When an ECU having an immediately previous turn does not transmit a data frame, each second ECU 12 waits again until the waiting period passes after the elapse of the waiting period of the ECU having an immediately previous turn. If there is a data frame to be transmitted, the second ECU 12 transmits the data frame after the elapse of the waiting period. When the second ECU 12 having a last turn does not transmit a data frame, the first ECU 11 transmits the beacon signal again when the waiting period of the second ECU 12 having a last turn passes.

In addition, when the number of second ECUs 12 is not 4, as in the case where the number of second ECUs 12 is 4, the plurality of second ECUs 12 sequentially transmits data frames after the first ECU 11 transmits the data frame.

Hereinafter, the number of ECUs connected to the communication bus B will be referred to as the number of devices. When no data frame is transmitted, the beacon signal transmission interval is the sum of a plurality of waiting periods. The number of waiting periods matches the number of devices. When one or more data frames are transmitted, the beacon signal transmission interval is the sum of a plurality of waiting periods and a period required for transmitting one or more data frames. Therefore, the beacon signal transmission interval increases with an increase in one waiting period.

As shown in FIG. 1, common device number data indicating the number of devices is input from the outside to each of the first ECU 11 and the plurality of second ECUs 12. Each of the first ECU 11 and the plurality of second ECUs 12 calculates the value of the waiting period based on the number of devices indicated by the input device number data. Each of the first ECU 11 and the plurality of second ECUs 12 changes the stored waiting period data to waiting period data indicating the calculated value. Then, the waiting period indicated by the waiting period data is changed to the calculated value.

Advantages of PLCA Method

In addition to the PLCA method, a CSMA/CD (Carrier Sense Multiple Access/Collision Detection) method can be used as a method of communication through a communication bus. In the CSMA/CD method, each of a plurality of ECUs transmits a data frame through the communication bus as in the PLCA method. When a plurality of data frames collide, each ECU detects the collision of the plurality of data frames. Each of the plurality of ECUs that are transmission sources of the plurality of data frames that have collided with each other retransmits the data frame. The timings at which a plurality of ECUs transmit data frames are different from each other. Therefore, the collision of a plurality of data frames is avoided.

In the CSMA/CD method, when a plurality of data frames collide, the delay time of the data frames caused by the collision is not defined. However, in the PLCA method, a period of transmitting the data frame is assigned to each of the first ECU 11 and the plurality of second ECUs 12. For this reason, the collision of data frames does not occur. As a result, in the PLCA method, it is possible to guarantee the maximum delay time. If the maximum delay time is guaranteed, it is easy to design an in-vehicle network.

Beacon Signal

FIG. 4 is a waveform diagram of a beacon signal. The vertical and horizontal axes of FIG. 4 indicate the voltage difference and time, respectively. The waveform of the beacon signal shown in FIG. 4 is an example. The communication bus B includes a first conducting wire W1 and a second conducting wire W2 (see FIG. 6). The first conducting wire W1 and the second conducting wire W2 are twisted together. Therefore, a twisted pair wire is realized. The beacon signal has a plurality of bits. Each of the first ECU 11 and the plurality of second ECUs 12 transmits a beacon signal by adjusting the voltage difference between the first conducting wire W1 and the second conducting wire W2 included in the communication bus B to a high level voltage or a low level voltage each time a period of one bit passes. In FIG. 4, H and L indicate a high level voltage and a low level voltage, respectively.

The data frame also has a plurality of bits. Each of the first ECU 11 and the plurality of second ECUs 12 transmits a data frame by adjusting the voltage difference between the first conducting wire W1 and the second conducting wire W2 included in the communication bus B to a high level voltage or a low level voltage each time a period of one bit passes.

Each bit indicates a high level voltage or a low level voltage. In the example of FIG. 4, the beacon signal has seven bits. In the beacon signal shown in FIG. 4, a high level voltage and a low level voltage are alternately output. In addition, the number of bits forming the beacon signal is not limited to seven.

The waveform of the beacon signal is determined in advance. When the first ECU 11 transmits a beacon signal through the communication bus B, all of the second ECUs 12 receive the beacon signal. In each second ECU 12, a clock signal formed by the high level voltage and the low level voltage is output. In the clock signal, voltage rise or fall is periodically performed. The voltage rise is a switch from the low level voltage to the high level voltage. The voltage fall is a switch from the high level voltage to the low level voltage. When the beacon signal is received, each second ECU 12 adjusts the rising or falling time of the clock signal. Each of the second ECUs 12 adjusts the rising or falling time to the end time of the beacon signal, for example.

Here, in a configuration in which processing is performed at the rising time of the clock signal, the rising time of the clock signal is adjusted. In a configuration in which processing is performed at the falling time of the clock signal, the falling time of the clock signal is adjusted.

Each second ECU 12 adjusts the rising or falling time of the clock signal, thereby realizing synchronization between the first ECU 11 and the plurality of second ECUs 12. As a result, the timings at which the first ECU 11 and the plurality of second ECUs 12 perform processes substantially match each other. In addition, the waveform of the beacon signal is not limited to the waveform shown in FIG. 4.

Configuration of First ECU 11

Figure 5:
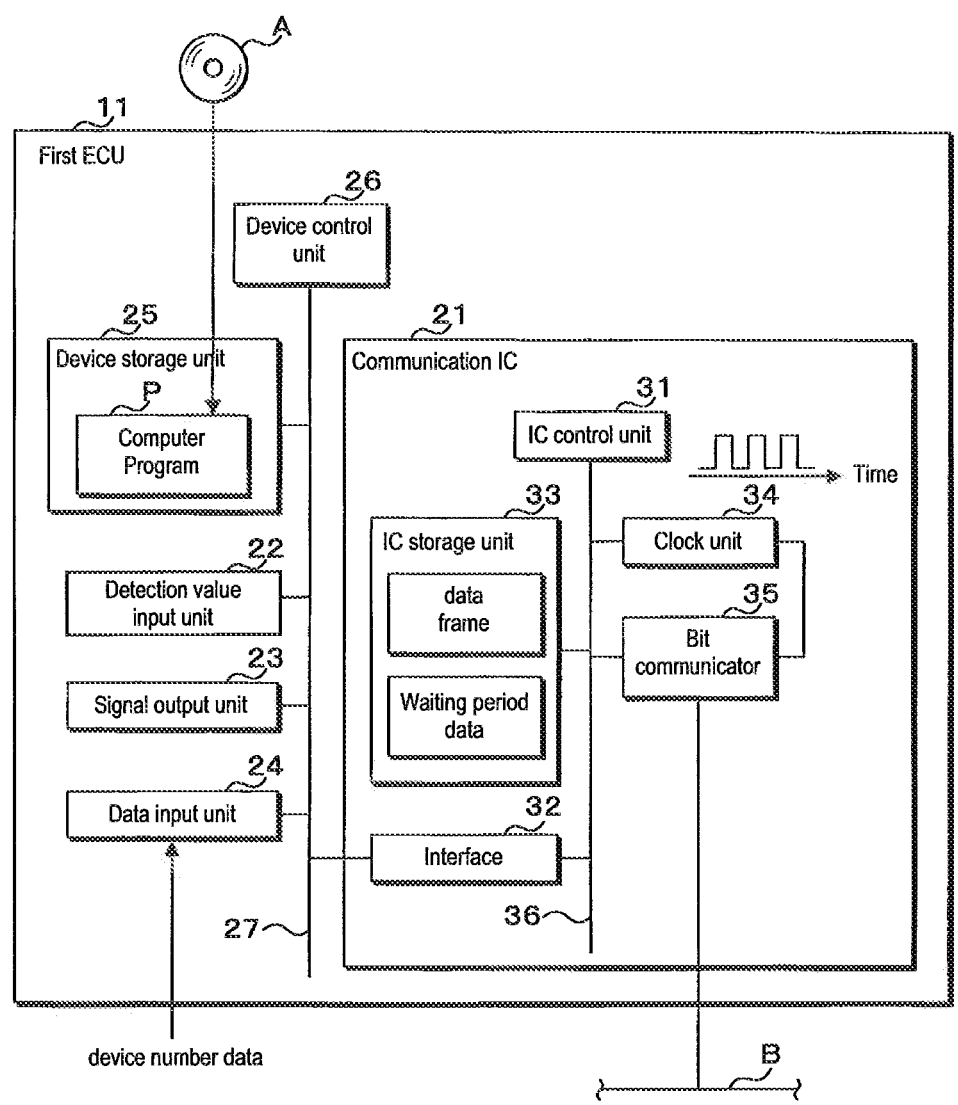
FIG. 5 is a block diagram showing the main configuration of the first ECU.

FIG. 5 is a block diagram showing the main configuration of the first ECU 11. The first ECU 11 includes a communication IC 21, a detection value input unit 22, a signal output unit 23, a data input unit 24, a device storage unit 25, and a device control unit 26. These are connected to a device bus 27. IC is an abbreviation for Integrated Circuit. The communication IC 21 is further connected to the communication bus B. The detection value input unit 22 is further connected to a sensor. The signal output unit 23 is further connected to electrical equipment. The sensor and the electrical equipment are not shown.

The sensor outputs the detection value to the detection value input unit 22. For example, when a sensor detection value is input to the detection value input unit 22, the device control unit 26 generates a data frame including the sensor detection value as main data. The device control unit 26 provides the generated data frame to the communication IC 21. When the data frame is provided, the communication IC 21 transmits the provided data frame through the communication bus B.

The communication IC 21 receives the data frame transmitted through the communication bus B. When the data frame is received, the communication IC 21 discards the received data frame if the transmission destination of the received data frame is different from the first ECU 11. When the data frame is received, the communication IC 21 provides the received data frame to the device control unit 26 when the transmission destination of the received data frame is the first ECU 11.

When the received data frame is provided, the device control unit 26 determines an operation to be performed by the electrical equipment based on the main data of the provided data frame. When the operation to be performed by the electrical equipment is determined, the device control unit 26 instructs the signal output unit 23 to output an operation signal indicating the determined operation to the electrical equipment. As described above, when the operation signal is input, the electrical equipment performs the operation indicated by the input operation signal.

The communication IC 21 transmits data frames according to the PLCA method. Waiting period data is stored in the communication IC 21. The communication IC 21 repeatedly transmits a beacon signal. The communication IC 21 waits until the waiting period indicated by the waiting period data passes from the end of the transmission of the beacon signal. The communication IC 21 transmits the data frame after the elapse of the waiting period. If there is no data frame to be transmitted, the communication IC 21 does not transmit the data frame. As described above, the second ECU 12 having the second turn waits until the waiting period indicated by the waiting period data passes after the elapse of the waiting period of the first ECU 11.

Device number data is input to the data input unit 24. The device control unit 26 calculates the value of the waiting period based on the device number data input to the data input unit 24. The device control unit 26 provides the communication IC 21 with waiting period data indicating the calculated value as a waiting period. The communication IC 21 changes the stored waiting period data to the waiting period data provided from the communication IC 21. Then, the waiting period is changed to the value calculated by the device control unit 26.

The device storage unit 25 is formed by, for example, a non-volatile memory and a volatile memory. A computer program P is stored in the device storage unit 25. The device control unit 26 has a processing element that performs processing, for example, a CPU (Central Processing Unit). The device control unit 26 functions as a processing unit. The processing element of the device control unit 26 executes the computer program P to perform period calculation processing, frame generation processing, signal output processing, and the like in parallel. In the period calculation processing, the device control unit 26 calculates the value of the waiting period. In the frame generation processing, the device control unit 26 generates a data frame as described above, and provides the generated data frame to the communication IC 21. In the signal output processing, the device control unit 26 instructs the signal output unit 23 to output an operation signal as described above.

In addition, the computer program P may be provided to the first ECU 11 by using a non-temporary storage medium A in which the computer program P is recorded in a readable manner. The storage medium A is, for example, a portable memory. Examples of the portable memory include a CD-ROM, a USB (Universal Serial Bus) memory, an SD card, a micro SD card, and a compact flash (registered trademark). If the storage medium A is a portable memory, the processing element of the device control unit 26 may read the computer program P from the storage medium A by using a reader (not shown). The read computer program P is stored in the device storage unit 25. In addition, the computer program P may be provided to the first ECU 11 by a communication unit (not shown) of the first ECU 11 communicating with an external device. In this case, the processing element of the device control unit 26 acquires the computer program P through the communication unit. The acquired computer program P is stored in the device storage unit 25.

The number of processing elements included in the device control unit 26 may be two or more. In this case, the plurality of processing elements included in the device control unit 26 may cooperate with each other to perform the period calculation processing, the frame generation processing, the signal output processing, and the like.

Configuration of Communication IC 21

The communication IC 21 of the first ECU 11 includes an IC control unit 31, an interface 32, an IC storage unit 33, a clock unit 34, and a bit communicator 35. These are connected to an IC bus 36. The interface 32 is further connected to the device bus 27. The clock unit 34 is further connected to the bit communicator 35. The bit communicator 35 is further connected to the communication bus B.

The device control unit 26 provides a data frame to the IC control unit 31 through the interface 32. The IC control unit 31 includes a processing element that performs processing, for example, a CPU. When the data frame is provided, the IC control unit 31 writes the provided data frame in the IC storage unit 33. The IC storage unit 33 is formed by, for example, a non-volatile memory and a volatile memory.

The clock unit 34 outputs a clock signal to the bit communicator 35. The IC control unit 31 provides the data frame stored in the IC storage unit 33 to the bit communicator 35 bit by bit. The IC control unit 31 provides a beacon signal to the bit communicator 35 bit by bit.

The bit communicator 35 transmits a one-bit signal or one-bit data provided from the IC control unit 31 each time the clock signal rises. The bit communicator 35 transmits a one-bit signal or one-bit data by adjusting the voltage difference between the first conducting wire W1 and the second conducting wire W2 included in the communication bus B to a high level voltage or a low level voltage. The voltage difference is maintained at the high level voltage or the low level voltage during one period of the clock signal. The period of the clock signal corresponds to the period of one bit.

The bit communicator 35 receives a one-bit signal or one-bit data by detecting the voltage difference between the first conducting wire W1 and the second conducting wire W2 included in the communication bus B each time the clock signal rises. The bit communicator 35 notifies the IC control unit 31 of the received one-bit signal or one-bit data.

In addition, the bit communicator 35 may transmit a one-bit signal or one-bit data provided from the IC control unit 31 each time the clock signal falls. In addition, the bit communicator 35 may receive a one-bit signal or one-bit data by detecting the voltage difference of the communication bus B each time the clock signal falls.

The IC control unit 31 controls the operation of the bit communicator 35 so that the bit communicator 35 performs communication according to the PLCA method. The bit communicator 35 transmits a beacon signal. The bit communicator 35 waits until the waiting period indicated by the waiting period data passes from the end of the transmission of the beacon signal. The waiting period data is stored in the IC storage unit 33.

When the bit communicator 35 receives the data frame, the IC control unit 31 discards the received data frame if the transmission destination of the received data frame is not the first ECU 11. When the bit communicator 35 receives the data frame, if the transmission destination of the received data frame is the first ECU 11, the IC control unit 31 provides the received data frame to the device control unit 26 through the interface 32. As described above, the device control unit 26 uses the main data of the data frame provided from the IC control unit 31 when determining the operation to be performed by the electrical equipment.

A computer program (not shown) is stored in the IC storage unit 33. The IC control unit 31 performs waiting period change processing, frame writing processing, frame transmission processing, frame reception processing, and the like in parallel by executing a computer program. In the waiting period change processing, the IC control unit 31 changes the waiting period data stored in the IC storage unit 33. If the waiting period data is changed, the waiting period is changed. In the frame writing processing, the IC control unit 31 writes a data frame into the IC storage unit 33 as described above. In the frame transmission processing, the IC control unit 31 causes the bit communicator 35 to transmit a beacon signal. After causing the bit communicator 35 to transmit the beacon signal, the IC control unit 31 causes the bit communicator 35 to transmit a data frame. In the frame reception processing, the IC control unit 31 performs processing related to the data frame received by the bit communicator 35 as described above.

Configuration of Bit Communicator 35

Figure 6:
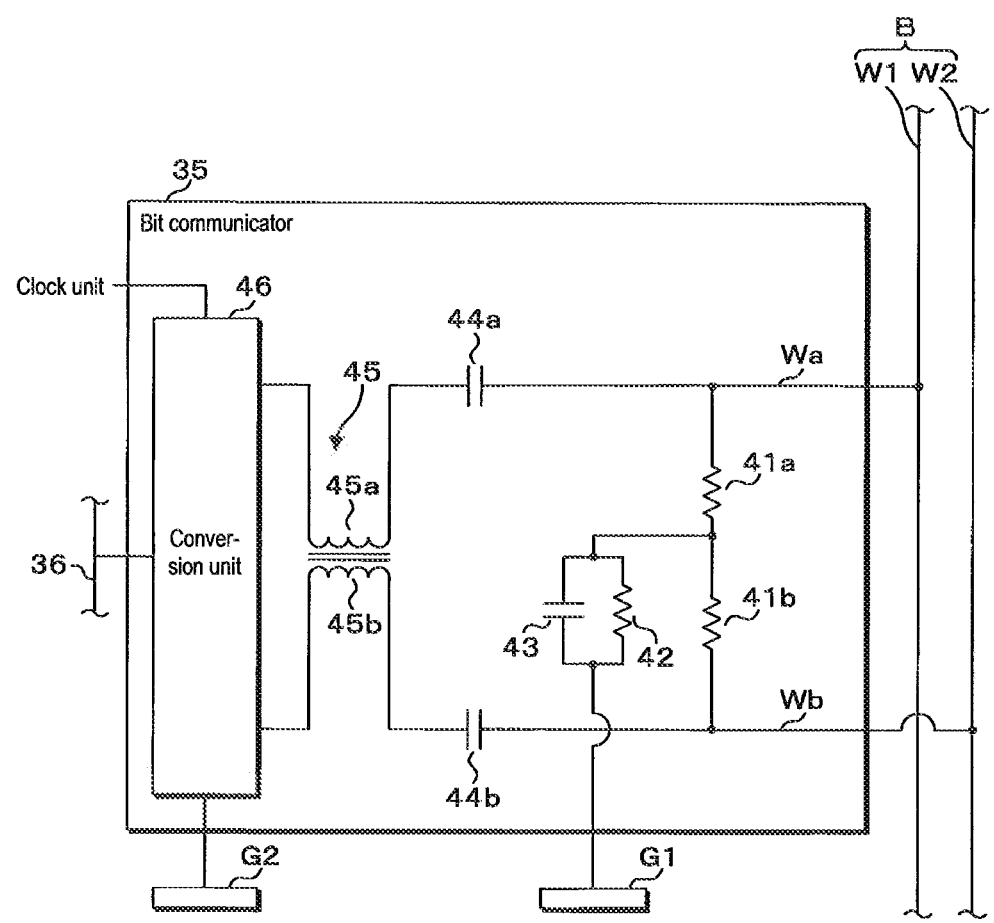
FIG. 6 is a circuit diagram of a bit communicator.

FIG. 6 is a circuit diagram of the bit communicator 35. The bit communicator 35 includes three resistors 41*a*, 41*b*, and 42, three capacitors 43, 44*a*, and 44*b*, a common mode choke coil 45, and a conversion unit 46. The common mode choke coil 45 includes a first inductor 45*a*, a second inductor 45*b*, and an annular magnetic body. Each of the first inductor 45*a* and the second inductor 45*b* is wound around the magnetic body.

The conversion unit 46 of the bit communicator 35 is connected to the first conducting wire W1 of the communication bus B by an equipment conducting wire Wa. The conversion unit 46 of the bit communicator 35 is connected to the second conducting wire W2 of the communication bus B by an equipment conducting wire Wb. The conversion unit 46 is further connected to the clock unit 34 and the IC bus 36.

The capacitor 44*a* and the first inductor 45*a* of the common mode choke coil 45 are arranged in the middle of the equipment conducting wire Wa. The capacitor 44*a* is arranged on the first conducting wire W1 side of the first inductor 45*a*. Similarly, the capacitor 44*b* and the second inductor 45*b* of the common mode choke coil 45 are arranged in the middle of the equipment conducting wire Wb. The capacitor 44*b* is arranged on the second conducting wire W2 side of the second inductor 45*b*.

On the first conducting wire W1 side of the capacitor 44*a*, one end of the resistor 41*a* is connected to the equipment conducting wire Wa. Similarly, on the second conducting wire W2 side of the capacitor 44*b*, one end of the resistor 41*b* is connected to the equipment conducting wire Wb. The other end of the resistor 41*a* is connected to the other end of the resistor 41*b*. A connection node between the resistors 41*a* and 41*b* is connected to one end of the resistor 42 and one end of the capacitor 43. The other ends of the resistor 42 and the capacitor 43 are connected to a first conductor G1. The first conductor G1 is arranged in the first ECU 11.

The resistors 41*a*, 41*b*, and 42 and the capacitor 43 function as a terminating circuit to suppress reflection of a signal or data represented by the voltage difference between the first conducting wire W1 and the second conducting wire W2.

The two capacitors 44*a* and 44*b* remove DC components from the two voltages input from the two equipment conducting wires Wa and Wb. The capacitors 44*a* and 44*b* output two voltages, from which DC components have been removed, to the common mode choke coil 45.

The common mode choke coil 45 removes common mode noise from the two voltages output from the capacitors 44a and 44b and outputs two voltages, from which the common mode noise has been removed, to the conversion unit 46.

The conversion unit 46 detects a voltage difference between the two voltages input from the common mode choke coil 45 each time the clock signal input from the clock unit 34 rises or falls. When the voltage difference is detected, the conversion unit 46 outputs a bit value corresponding to the detected voltage difference to the IC control unit 31. The bit value is 0 or 1. For example, if the voltage difference is a low level voltage, 0 is output as a bit value. If the voltage difference is a high level voltage, 1 is output as a bit value. The bit value is represented by a voltage whose reference potential is the potential of a second conductor G2. Bit values of 1 and 0 respectively correspond to a high level voltage and a low level voltage whose reference potential is the second conductor G2, for example. The second conductor G2 is arranged inside the first ECU 11, and is different from the first conductor G1.

As described above, the bit communicator 35 transmits a one-bit signal or one-bit data. The IC control unit 31 provides the one-bit signal or one-bit data to the conversion unit 46. The conversion unit 46 adjusts the voltage difference between the two equipment conducting wires Wa and Wb to a voltage corresponding to the one-bit signal or one-bit data provided from the IC control unit 31 each time the clock signal input from the clock unit 34 rises or falls.

The two voltages output from the conversion unit 46 are input to the common mode choke coil 45. The common mode choke coil 45 removes common mode noise from the two voltages output from the conversion unit 46 and outputs two voltages, from which the common mode noise has been removed, to the two capacitors 44a and 44b. The two capacitors 44a and 44b remove DC components from the two voltages input from the common mode choke coil 45. The capacitors 44a and 44b apply two voltages, from which DC components have been removed, to the first conducting wire W1 and the second conducting wire W2 of the communication bus B, respectively. As a result, the voltage difference between the first conducting wire W1 and the second conducting wire W2 is adjusted to a high level voltage or a low level voltage.

The configuration of the bit communicator 35 conforms to 10BASE-T1S of IEEE802.3cg. Therefore, the bit communicator 35 is configured to realize the transmission of a baseband signal with a data rate of 10 Mbps. Here, the baseband signal is transmitted through a twisted pair wire including the first conducting wire W1 and the second conducting wire W2. IEEE is a registered trademark, and is an abbreviation for Institute of Electrical and Electronics Engineers.

Configuration of Second ECU 12

Each second ECU 12 is configured similarly to the first ECU 11. Therefore, the bit communicator 35 of each of the plurality of second ECUs 12 is connected to the communication bus B. When the second ECU 12 is compared with the first ECU 11, the timing at which the bit communicator 35 of the communication IC 21 transmits a data frame and the configuration regarding the beacon signal are different.

Also in the communication IC 21 of the second ECU 12, the IC control unit 31 controls the operation of the bit communicator 35 so that the bit communicator 35 transmits a data frame according to the PLCA method. The communication IC 21 of the second ECU 12 also stores waiting period data. The bit communicator 35 of the second ECU 12 does not transmit a beacon signal. The bit communicator 35 of the second ECU 12 waits until the waiting period indicated by the waiting period data passes from the end of the transmission of the data frame from the first ECU 11 or the second ECU 12 having an immediately previous turn.

The bit communicator 35 of the second ECU 12 transmits a data frame after the elapse of the waiting period. If there is no data frame to be transmitted, the bit communicator 35 of the second ECU 12 does not transmit the data frame. As described above, the second ECU 12 having a next turn waits until the waiting period indicated by the waiting period data passes after the elapse of the waiting period.

In the second ECU 12, the IC control unit 31 does not provide the beacon signal to the bit communicator 35. The bit communicator 35 receives a beacon signal. When the beacon signal is received, the IC control unit 31 adjusts the rising or falling time of the clock signal based on the received beacon signal, as described in the description of the beacon signal. In a configuration in which processing is performed at the rising time of the clock signal, the rising time of the clock signal is adjusted. In a configuration in which processing is performed at the falling time of the clock signal, the falling time of the clock signal is adjusted.

Similarly to the IC control unit 31 of the first ECU 11, the IC control unit 31 of the second ECU 12 performs waiting period change processing, frame writing processing, frame transmission processing, frame reception processing, and the like by executing a computer program. However, in the frame transmission processing of the second ECU 12, the IC control unit 31 adjusts the clock signal based on the beacon signal received by the bit communicator 35. After adjusting the clock signal, the IC control unit 31 causes the bit communicator 35 to transmit the data frame.

Procedure for Changing Waiting Period

Figure 7:
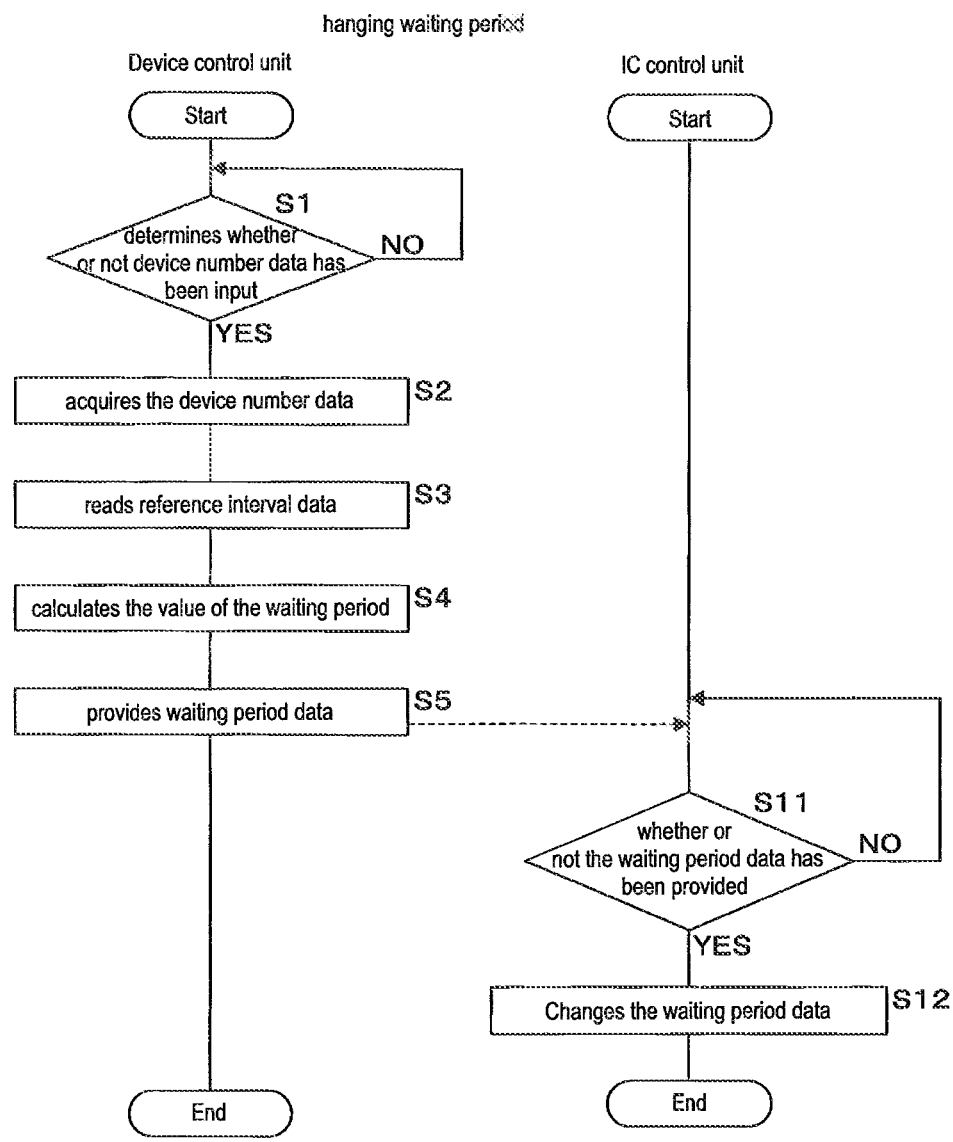
FIG. 7 is a flowchart showing a procedure for changing a waiting period.

FIG. 7 is a flowchart showing a procedure for changing the waiting period. In each of the first ECU 11 and the plurality of second ECUs 12, the waiting period is changed in the same manner. FIG. 7 shows the period calculation processing of the device control unit 26 and the waiting period change processing of the IC control unit 31. Reference interval data indicating a predetermined reference interval is stored in the device storage unit 25 of each of the first ECU 11 and the plurality of second ECUs 12.

In the period calculation processing, the device control unit 26 determines whether or not device number data has been input to the data input unit 24 from the outside (step S1). For example, the user operates a data output device that outputs the device number data. In this case, the data output device outputs the device number data to the data input unit 24. When it is determined that no device number data has been input to the data input unit 24 (S1: NO), the device control unit 26 executes step S1 again. The device control unit 26 waits until the device number data is input to the data input unit 24.

When it is determined that the device number data has been input to the data input unit 24 (S1: YES), the device control unit 26 acquires the device number data input to the data input unit 24 from the outside (step S2). Acquiring the device number data corresponds to acquiring the number of devices. Then, the device control unit 26 reads reference interval data from the device storage unit 25 (step S3). Then, the device control unit 26 calculates the value of the waiting period based on the device number data acquired in step S2 and the reference interval data read in step S3 (step S4).

The beacon signal transmission period is expressed as Tb. The beacon signal transmission interval is a period from the start of transmission to the end of transmission for the beacon signal. The number of devices indicated by the device number data is expressed as Nd. The reference interval indicated by the reference interval data is expressed as Tr. In this case, in step S4, for example, the device control unit 26 calculates the value Tc of the waiting period according to the following Equation.

$$Tc = (Tr - Tb)/Nd$$

In addition, in step S4, an error may be taken into consideration. Errors occur, for example, when the start of transmission of a beacon signal or a data frame is delayed. When the absolute value of the error is expressed as E, the value Tc of the waiting period calculated in step S3 is (((Tr−Tb)/Nd)+E) or (((Tr−Tb)/Nd)−E).

Then, the device control unit 26 provides waiting period data indicating the value calculated in step S4, as the waiting period, to the IC control unit 31 through the interface 32 (step S5). After executing step S5, the device control unit 26 ends the period calculation processing. After ending the period calculation processing, the device control unit 26 performs the period calculation processing again.

In the waiting period change processing, the IC control unit 31 determines whether or not the waiting period data has been provided from the device control unit 26 (step S11). When it is determined that no waiting period data has been provided (S11: NO), the IC control unit 31 executes step S11 again. The IC control unit 31 waits until the waiting period data is provided from the device control unit 26.

When it is determined that the waiting period data has been provided (S11: YES), the IC control unit 31 changes the waiting period data stored in the IC storage unit 33 to the provided waiting period data (step S12), and ends the waiting period change processing. After ending the waiting period change processing, the IC control unit 31 performs the waiting period change processing again.

As described above, if the waiting period data stored in the IC storage unit 33 is changed, the waiting period is changed. Therefore, the device control unit 26 changes the waiting period by executing step S5. As shown in FIG. 2, if the waiting period is changed, the beacon signal transmission interval is changed.

Procedure for Transmitting Data Frame

Figure 8:
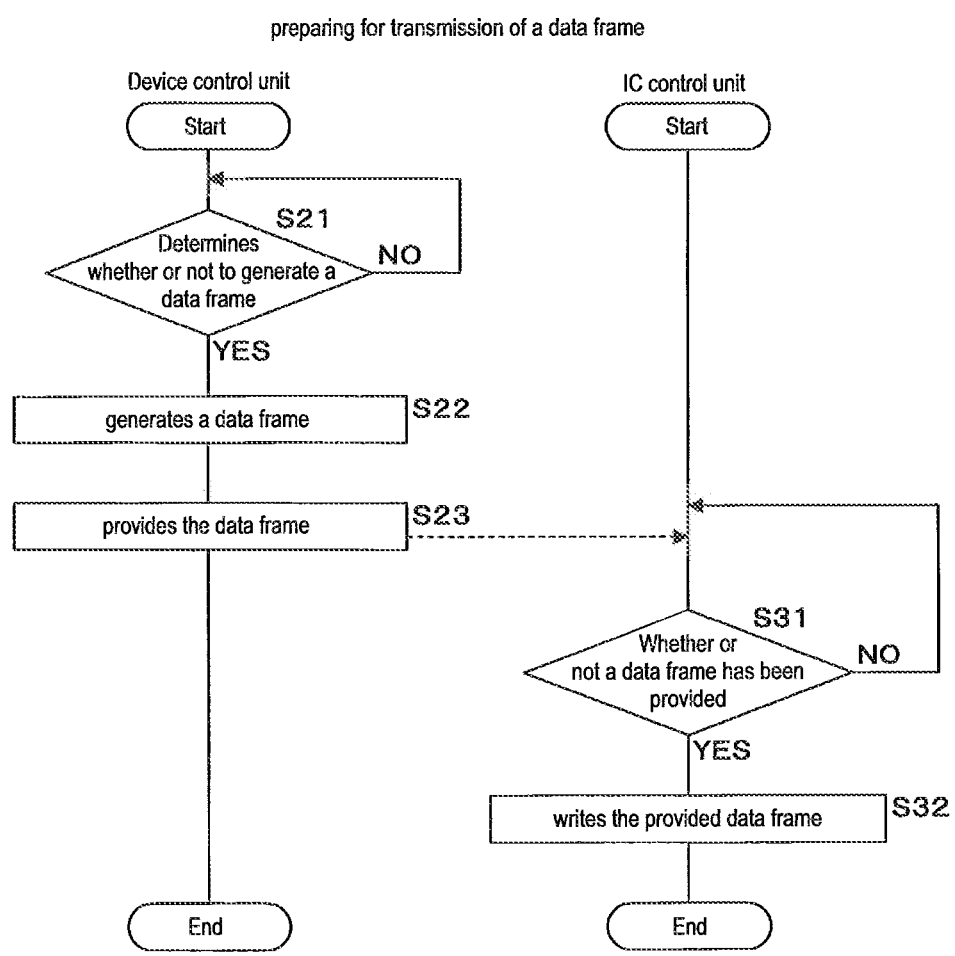
FIG. 8 is a flowchart showing a procedure for preparing for transmission of a data frame.

FIG. 8 is a flowchart showing a procedure for preparing for transmission of a data frame. In each of the first ECU 11 and the plurality of second ECUs 12, preparation for transmission of the data frame is performed in the same manner. FIG. 8 shows frame generation processing of the device control unit 26 and frame writing processing of the IC control unit 31.

In the frame generation processing, first, the device control unit 26 determines whether or not to generate a data frame (step S21). In step S21, for example, when a detection value of a sensor is input to the detection value input unit 22, the device control unit 26 determines that a data frame is to be generated. In this case, the main data of the data frame is the sensor detection value input to the detection value input unit 22. When it is determined that no data frame is to be generated (S21: NO), the device control unit 26 executes step S21 again and waits until the timing to generate a data frame arrives.

When it is determined that a data frame is to be generated (S21: YES), the device control unit 26 generates a data frame (step S22). Then, the device control unit 26 provides the data frame generated in step S22 to the IC control unit 31 through the interface 32 (step S23). After executing step S23, the device control unit 26 ends the data frame generation processing. After ending the frame generation processing, the device control unit 26 performs the frame generation processing again.

In the frame writing processing, first, the IC control unit 31 determines whether or not a data frame has been provided from the device control unit 26 (step S31). When it is determined that no data frame has been provided (S31: NO), the IC control unit 31 executes step S31 again and waits until the data frame is provided from the device control unit 26.

When it is determined that the data frame has been provided from the device control unit 26 (S31: YES), the IC control unit 31 writes the provided data frame in the IC storage unit 33 (step S32). After executing step S32, the IC control unit 31 ends the frame writing processing. After ending the frame writing processing, the IC control unit 31 performs the frame writing processing again.

As described above, when the device control unit 26 generates a data frame, the generated data frame is written into the IC storage unit 33. The data frame stored in the IC storage unit 33 is transmitted through the communication bus B.

Figure 9:
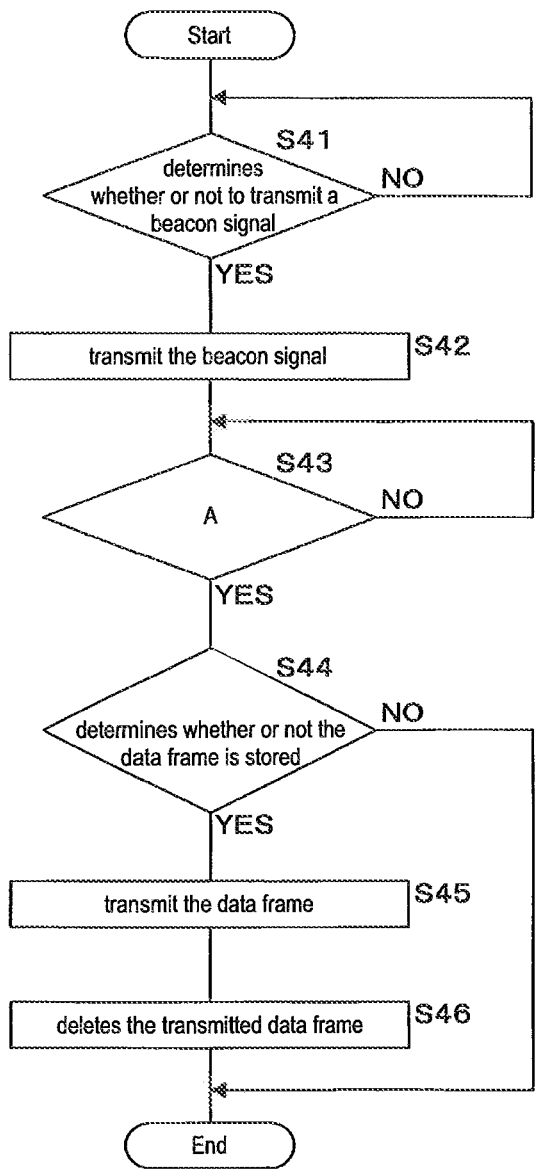
FIG. 9 is a flowchart showing the procedure of frame transmission processing performed by an IC control unit of the first ECU.

FIG. 9 is a flowchart showing the procedure of frame transmission processing performed by the IC control unit 31 of the first ECU 11. In the frame transmission processing, first, the IC control unit 31 determines whether or not to transmit a beacon signal (step S41). When the second ECU 12 having a last turn does not transmit a data frame, the timing at which the beacon signal is transmitted is a timing when the waiting period of the second ECU 12 having a last turn passes. For example, a timer is used to determine whether or not the waiting period has passed.

When the second ECU 12 having a last turn transmits a data frame, the timing at which the beacon signal is transmitted is a timing when the second ECU 12 having a last turn ends the transmission of the data frame. In the data frame, length data indicating the data length of the main data is arranged before the main data. The IC control unit 31 can grasp the timing at which the transmission of the data frame ends based on the data length of the data frame.

When it is determined that no beacon signal is to be transmitted (S41: NO), the IC control unit 31 executes step S41 again and waits until the timing to transmit the beacon signal arrives. When it is determined that the beacon signal is to be transmitted (S41: YES), the IC control unit 31 instructs the bit communicator 35 to transmit the beacon signal through the communication bus B (step S42). As described above, in the second ECU 12, when the bit communicator 35 receives the beacon signal, the IC control unit 31 adjusts the clock signal.

The data frame transmission turn of the first ECU 11 is first. Therefore, for the first ECU 11, when the transmission of the beacon signal ends, the data frame transmission turn comes. After executing step S42, the IC control unit 31 determines whether or not the waiting period indicated by the waiting period data has passed from the end of the transmission of the beacon signal (step S43). When it is determined that the waiting period has not elapsed (S43: NO), the IC control unit 31 executes step S43 again and waits until the waiting period passes. The elapse of the waiting period means that the period taken for waiting is equal to or longer than the waiting period.

When it is determined that the waiting period has passed (S43: YES), the IC control unit 31 determines whether or not the data frame is stored in the IC storage unit 33 (step S44).

When it is determined that the data frame is stored in the IC storage unit 33 (S44: YES), the IC control unit 31 instructs the bit communicator 35 to transmit the data frame stored in the IC storage unit 33 bit by bit through the communication bus B (step S45). The bit communicator 35 functions as a data transmission unit. After executing step S45, the IC control unit 31 deletes the transmitted data frame from the IC storage unit 33 (step S46).

When it is determined that no data frame is stored in the IC storage unit 33 (S44: NO) or after executing step S46, the IC control unit 31 ends the frame transmission processing. When no data frame is stored in the IC storage unit 33, the IC control unit 31 ends the frame transmission processing without causing the bit communicator 35 to transmit the data frame. After ending the frame transmission processing, the IC control unit 31 performs the frame transmission processing again. The IC control unit 31 waits until the timing to transmit the beacon signal arrives.

As described above, the IC control unit 31 of the first ECU 11 instructs the bit communicator 35 to repeatedly transmit the beacon signal through the communication bus B. The bit communicator 35 of the first ECU 11 also functions as a signal transmission unit. When the beacon signal is transmitted, the IC control unit 31 causes the bit communicator 35 to transmit the data frame in a predetermined order, for example, according to the chart in FIG. 3.

Figure 10:
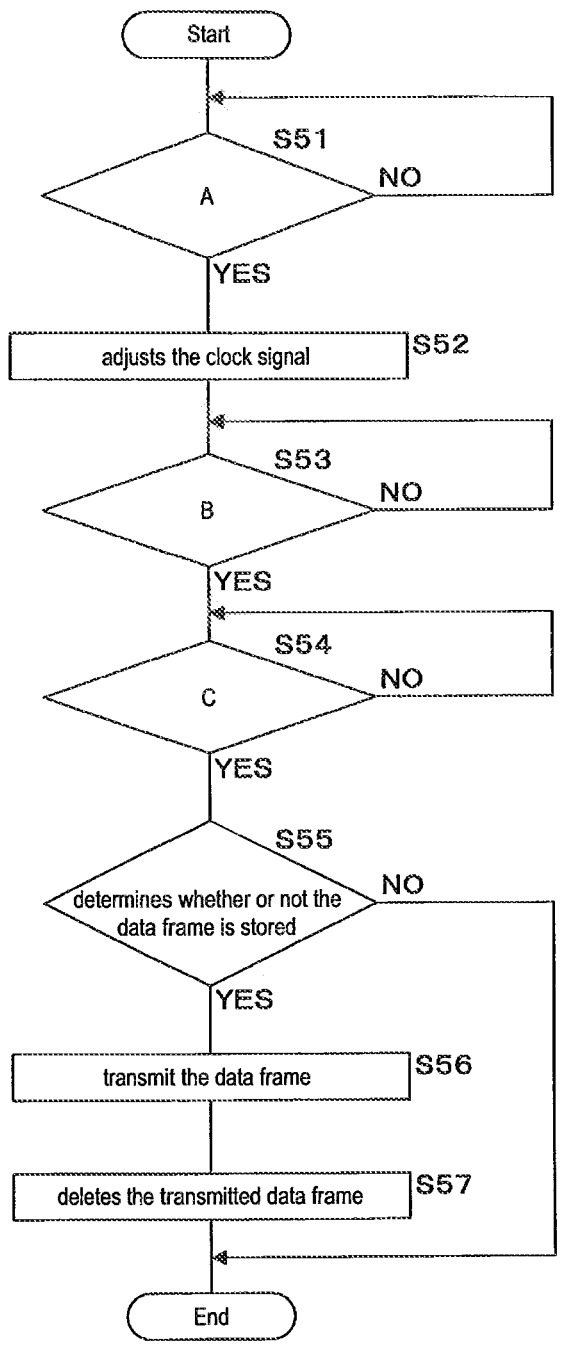
FIG. 10 is a flowchart showing the procedure of frame transmission processing performed by an IC control unit of the second ECU.

FIG. 10 is a flowchart showing the procedure of frame transmission processing performed by the IC control unit 31 of the second ECU 12. Steps S55 to S57 of the frame transmission processing performed by the IC control unit 31 of the second ECU 12 are the same as steps S44 to S46 of the frame transmission processing performed by the IC control unit 31 of the first ECU 11. Therefore, the description of steps S55 to S57 will be omitted.

In the frame transmission processing, first, the IC control unit 31 of the second ECU 12 determines whether or not the bit communicator 35 has received a beacon signal (step S51). When it is determined that the bit communicator 35 has not received the beacon signal (S51: NO), the IC control unit 31 executes step S51 again and waits until the bit communicator 35 receives the beacon signal.

When it is determined that the bit communicator 35 has received the beacon signal (S51: YES), the IC control unit 31 adjusts the clock signal output from the clock unit 34 (step S52). In step S52, the IC control unit 31 adjusts the rising or falling time of the clock signal as described above. After executing step S52, the IC control unit 31 determines whether or not the turn to transmit the data frame has arrived (step S53).

When the bit communicator 35 of the first ECU 11 or the second ECU 12 having an immediately previous turn transmits a data frame, the turn for transmission arrives when the transmission of the data frame ends. When the bit communicator 35 of the first ECU 11 or the second ECU 12 having an immediately previous turn does not transmit a data frame, the turn for transmission arrives when the waiting period of the first ECU 11 or the second ECU 12 having an immediately previous turn passes.

When it is determined that the turn for transmission has not arrived (S53: NO), the IC control unit 31 executes step S53 again. The IC control unit 31 waits until the turn for transmission arrives. When it is determined that the turn for transmission has arrived (S53: YES), the IC control unit 31 determines whether or not the waiting period indicated by the waiting period data has passed from the arrival of the turn for transmission (step S54). When it is determined that the waiting period has not passed (S54: NO), the IC control unit 31 executes step S54 again. The IC control unit 31 waits until the waiting period passes.

When it is determined that the waiting period has passed (S54: YES), the IC control unit 31 executes step S55. Therefore, when a data frame is stored in the IC storage unit 33, the bit communicator 35 transmits the data frame. Thereafter, the IC control unit 31 deletes the data frame transmitted from the bit communicator 35 from the IC storage unit 33, and ends the frame transmission processing. When no data frame is stored in the IC storage unit 33, the IC control unit 31 instructs the bit communicator 35 to end the frame transmission processing without transmitting the data frame. After ending the frame transmission process, the IC control unit 31 executes the frame transmission process again.

Relationship Between Transmission Interval and Disturbance Noise

FIG. 11 is an explanatory diagram showing the relationship between the transmission interval and disturbance noise. Here, it is assumed that the error is zero. FIG. 11 shows an example in which the number of second ECUs 12 is 4. The number of devices is 5. As described above, the beacon signal transmission period, the waiting period, and the number of devices are expressed as Tb, Tc, and Nd, respectively. The waiting period of the waiting period data is changed to the calculated value Tc. Therefore, the waiting period is expressed as Tc.

As shown in FIG. 11, when none of the first ECU 11 and the plurality of second ECUs 12 transmits a data frame, the beacon signal transmission interval is the shortest. At this time, the beacon signal transmission interval is (Tb+(Nd·Tc)), which matches a reference interval Tr. "·" indicates a product. When the transmission interval is short, the number of times the bit communicator 35 of the first ECU 11 switches the voltage of the communication bus B so that the voltage difference becomes a high level voltage or a low level voltage is the largest. When the voltage of the communication bus B is switched, disturbance noise is generated. When the number of switching times per unit time is large, the intensity (peak value) of disturbance noise is large.

When some of the first ECU 11 and the plurality of second ECUs 12 transmit data frames, the period required for transmitting one or more data frames is added to (Tb+(Nd·Tc)). For this reason, the beacon signal transmission interval is extended. Therefore, since the number of switching times per unit time is reduced, the intensity of disturbance noise is also reduced. In the example of FIG. 11, the first ECU 11 and the two second ECUs 12 having fourth and fifth turns transmit data frames. When all of the first ECU 11 and the plurality of second ECUs 12 transmit data frames, the beacon signal transmission interval is the longest. Therefore, since the number of switching times per unit time is the smallest, the intensity of disturbance noise is the smallest.

FIG. 12 is another explanatory diagram of the relationship between the transmission interval and disturbance noise. Here, the relationship between the transmission interval and disturbance noise will be described by using the spectrum of the signal (data) propagating through the communication bus B. When the same waveform is repeated at a fixed transmission interval, the spectrum is excited at a frequency interval of (1/transmission interval). Therefore, the shorter the transmission interval, the larger the frequency interval of the spectrum. Similarly to FIG. 11, FIG. 12 shows an example in which the number of second ECUs 12 is 4.

When none of the first ECU 11 and the plurality of second ECUs 12 transmits a data frame, the beacon signal transmission interval is the shortest, as described above. For this reason, the frequency interval of the spectrum is the longest. When some of the first ECU 11 and the plurality of second ECUs 12 transmit data frames, the beacon signal transmission interval is extended, as described above. For this reason, the frequency interval of the spectrum is reduced. When all of the first ECU 11 and the plurality of second ECUs 12 transmit data frames, the beacon signal is the shortest, as described above. For this reason, the frequency interval of the spectrum is the shortest.

The number of spectra excited within a predetermined frequency range decreases as the frequency interval increases, that is, as the beacon signal transmission interval decreases. Therefore, when the overall intensity is fixed, the intensity of each spectrum increases as the beacon signal transmission interval decreases. Therefore, when the beacon signal transmission interval is short, there is a spectrum that acts as high-intensity disturbance noise.

When the beacon signal transmission interval is the shortest, the beacon signal transmission interval is the reference interval. As shown in FIG. 12, in the communication system 1, when the beacon signal transmission interval is the reference interval, the spectrum intensity is less than an acceptable level that is allowed as the intensity of disturbance noise. Therefore, disturbance noise with an intensity equal to or greater than the acceptable level is not generated in the communication system 1.

As described above, the reference interval data is stored in the IC storage unit 33 of each of the first ECU 11 and the plurality of second ECUs 12. The reference interval indicated by the reference interval data is, for example, 60 μs or more. In this case, the device control unit 26 of each of the first ECU 11 and the plurality of second ECUs 12 changes the beacon signal transmission interval to a value of 60 μs or more by changing the waiting period in the period calculation processing. When the beacon signal transmission interval is 60 μs or more, the generation of high-intensity disturbance noise due to the beacon signal transmission interval is prevented.

It is preferable that the device control unit 26 of each of the first ECU 11 and the plurality of second ECUs 12 changes the beacon signal transmission interval to a value of 60 μs or more and 6500 μs or less. The maximum value of the beacon signal transmission interval is determined by the beacon signal transmission period, the number of devices, the waiting period, and the maximum data length of the data frame. The larger the number of devices, the larger the maximum value of the beacon signal transmission interval. For example, by limiting the number of devices, the device control unit 26 of each of the first ECU 11 and the plurality of second ECUs 12 can change the beacon signal transmission interval to a value of 6500 μs or less. When the beacon signal transmission interval is 6500 μs or less, the occurrence of communication delay due to the beacon signal transmission interval is prevented.

Effects of Communication System 1

As described above, the device control unit 26 of each of the first ECU 11 and the plurality of second ECUs 12 changes the beacon signal transmission interval by changing the waiting period. Then, the beacon signal transmission interval is changed to a value equal to or greater than the reference interval. As a result, the generation of high-intensity disturbance noise is prevented.

Modification Examples of First Embodiment

A plurality of waiting periods corresponding to the first ECU 11 and the plurality of second ECUs 12 may not be the same. Each waiting period may be different from at least one of the remaining waiting periods. In addition, the waiting periods of some of the first ECU 11 and the plurality of second ECUs 12 may be fixed. In this case, the device control unit 26 of each of the remaining one or more ECUs changes the beacon signal transmission interval by changing the waiting period. In this case, one or more device control units 26 collectively change the beacon signal transmission interval to a value equal to or greater than the reference interval.

Second Embodiment

In the first embodiment, the data input to the data input unit 24 is device number data. However, the data input to the data input unit 24 is not limited to the device number data.

Hereinafter, the points of a second embodiment that are different from the first embodiment will be described. Since configurations other than those described later are the same as those of the first embodiment, the same components as in the first embodiment are denoted by the same reference numerals as in the first embodiment, and the description thereof will be omitted.

Configuration of Communication System 1

Figure 13:
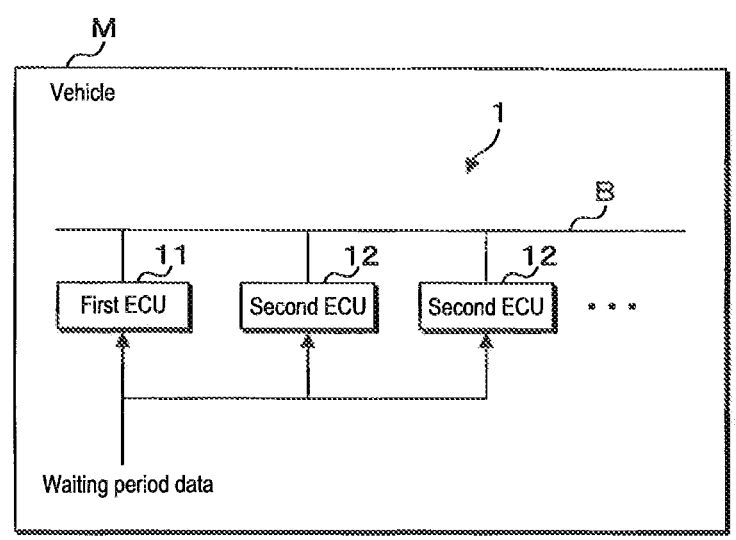
FIG. 13 is a block diagram showing the main configuration of a communication system according to a second embodiment.

FIG. 13 is a block diagram showing the main configuration of a communication system 1 according to the second embodiment. In the communication system 1 according to the second embodiment, instead of the device number data, common waiting period data indicating a waiting period is input to the data input unit 24 of each of the first ECU 11 and the plurality of second ECUs 12.

Configuration of First ECU 11 and Second ECU 12

In the second embodiment, the device control unit 26 of each of the first ECU 11 and the plurality of second ECUs 12 performs waiting period data provision processing for providing waiting period data to the IC control unit 31, instead of the period calculation processing, by executing the computer program P.

Procedure for Changing Waiting Period

Figure 14:
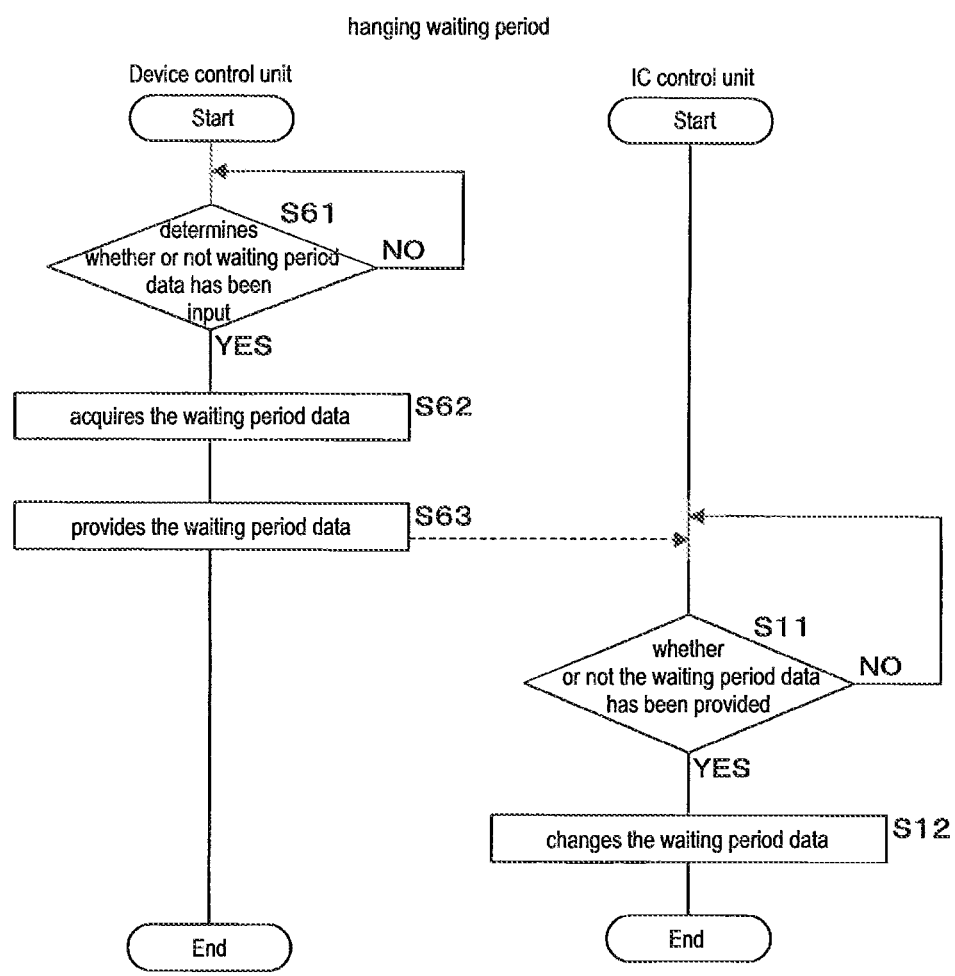
FIG. 14 is a flowchart showing a procedure for changing a waiting period.

FIG. 14 is a flowchart showing a procedure for changing a waiting period. In each of the first ECU 11 and the plurality of second ECUs 12, the waiting period is changed in the same manner. FIG. 14 shows the waiting period data provision processing of the device control unit 26 and the waiting period change processing of the IC control unit 31. The waiting period change processing is performed in the same manner as in the first embodiment.

In the waiting period data provision processing, the device control unit 26 determines whether or not waiting period data has been input to the data input unit 24 from the outside (step S61). When it is determined that no waiting period data has been input to the data input unit 24 (S61: NO), the device control unit 26 executes step S61 again. Then, the device control unit 26 waits until the waiting period data is input to the data input unit 24.

When it is determined that the waiting period data has been input to the data input unit 24 (S61: YES), the device control unit 26 acquires the waiting period data input to the data input unit 24 from the outside (step S62). Acquiring the waiting period data corresponds to acquiring the waiting period. Then, the device control unit 26 provides the waiting period data acquired in step S62 to the IC control unit 31 through the interface 32 (step S63). After executing step S63, the device control unit 26 ends the waiting period data provision processing. After ending the waiting period data provision processing, the device control unit 26 performs the waiting period data provision processing again.

As described in the description of the first embodiment, when the waiting period data is provided from the device control unit 26, the IC control unit 31 changes the waiting period data stored in the IC storage unit 33 to the waiting period data provided from the device control unit 26. Then, the waiting period is changed to a value (waiting period) indicated by the waiting period data input to the data input unit 24. Therefore, the device control unit 26 changes the waiting period by executing step S63. If the waiting period is changed, the beacon signal transmission interval is changed. The waiting period data indicates a waiting period in which the beacon signal transmission interval is a reference interval, for example, a value of 60 µs or more. It is preferable that the waiting period indicated by the waiting period data is a period in which the beacon signal transmission interval is a value of 60 µs or more and 6500 µs or less. For example, the upper limit of the waiting period indicated by the waiting period data is set according to the number of devices so that the beacon signal transmission interval is 6500 µs or less.

Effects of Communication System 1

Each of the first ECU 11 and the plurality of second ECUs 12 has the same effects as in the first embodiment.

Modification Examples of Second Embodiment

Common waiting period data may not be input to each of the first ECU 11 and the plurality of second ECUs 12. The waiting period data input to each of the first ECU 11 and the plurality of second ECUs 12 may be different from at least one of the pieces of other waiting period data. In this case, one waiting period is different from at least one of the remaining waiting periods. In addition, the waiting periods of some of the first ECU 11 and the plurality of second ECUs 12 may be fixed. In this case, waiting period data is input to the data input units 24 of the remaining one or more ECUs, and the waiting periods are changed. Each of the one or more pieces of waiting period data indicates a waiting period in which the beacon signal transmission interval is a value equal to or greater than the reference interval.

Third Embodiment

In the first embodiment, at least one of the first ECU 11 and the plurality of second ECUs 12 changes the beacon signal transmission interval by changing the waiting period. However, the method of changing the beacon signal transmission interval is not limited to the method of changing the waiting period.

Hereinafter, the points of a third embodiment that are different from the first embodiment will be described. Since configurations other than those described later are the same as those of the first embodiment, the same components as in the first embodiment are denoted by the same reference numerals as in the first embodiment, and the description thereof will be omitted.

Configuration of Communication System 1

Figures 15, 16:
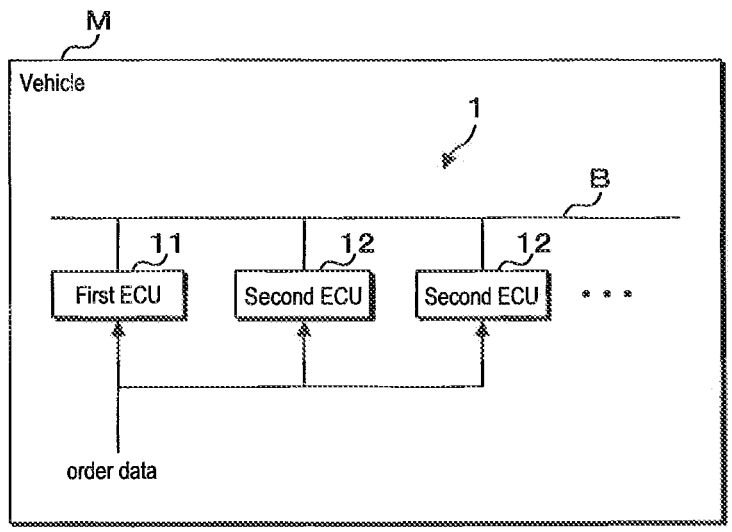
FIG. 15 is a block diagram showing the main configuration of a communication system according to a third embodiment.
FIG. 16 is a chart showing the contents of order data.

FIG. 15 is a block diagram showing the main configuration of a communication system 1 according to the third embodiment. In the third embodiment, common waiting period data is stored in the IC storage unit 33 of each of the first ECU 11 and the plurality of second ECUs 12. The waiting period data stored in each IC storage unit 33 is not changed. In addition, common order data indicating the order in which the first ECU 11 and the plurality of second ECUs 12 transmit data frames through the communication bus B is stored in the IC storage unit 33 of each of the first ECU 11 and the plurality of second ECUs 12. Each of the first ECU 11 and the plurality of second ECUs 12 transmits data frames through the communication bus B according to the order indicated by the order data stored in the IC storage unit 33.

In the third embodiment, instead of the device number data, order data is input to the data input unit 24 of each of the first ECU 11 and the plurality of second ECUs 12. In each of the first ECU 11 and the plurality of second ECUs 12, when the order data is input to the data input unit 24, the IC control unit 31 changes the order data stored in the IC storage unit 33 to the order data input to the data input unit 24. Then, the order in which data frames are transmitted is changed.

FIG. 16 is a chart showing the contents of order data. FIG. 16 shows an example in which the number of second ECUs 12 is 2. The number of devices is 3. As shown in FIG. 16, in the order data, a role and a data frame transmission turn are assigned in association with each of a plurality of IDs.

As in the first embodiment, the ECU with an ID of 001 is the first ECU 11. The first ECU 11 serves as a master. The transmission turn of the first ECU 11 is first. The two ECUs with IDs of 002 and 003 are the second ECUs 12. The second ECU 12 serves as a slave. The transmission turns corresponding to 002 and 003 are second and third, respectively.

In the order data, a role and a transmission turn are defined for each of four IDs corresponding to four virtual ECUs. The virtual ECUs are ECUs that do not exist. Therefore, the virtual ECUs do not transmit data frames. Each of the four ECUs with IDs of 991 to 994 is a virtual ECU. The roles of the four virtual ECUs are slaves. The turns of 991, 992, 993, and 994 are fourth, fifth, sixth, and seventh. Each of the first ECU 11 and the plurality of second ECUs 12 operates as if a virtual ECU exists. In addition, the number of virtual ECUs is not limited to 4. There is no problem as long as the number of virtual ECUs is a natural number.

Figure 17:
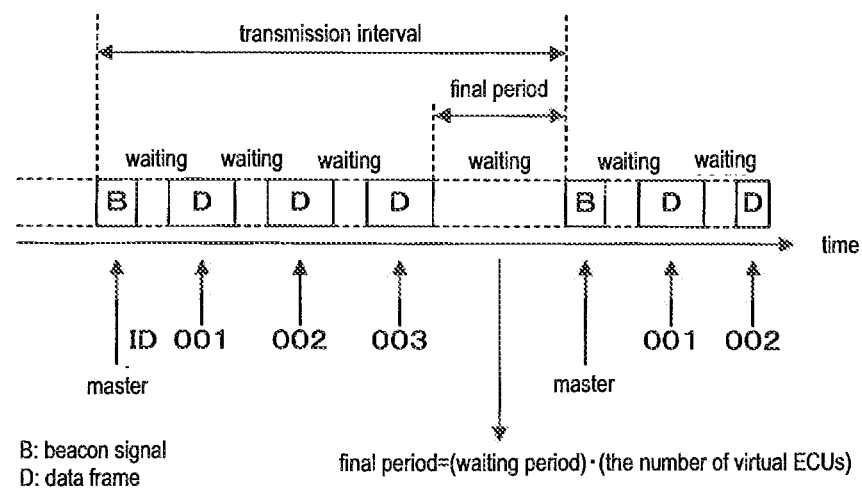
FIG. 17 is an explanatory diagram of data frame transmission.

FIG. 17 is an explanatory diagram of data frame transmission. Similarly to FIG. 16, FIG. 17 shows an example in which the number of second ECUs 12 is 2. FIG. 17 shows a state in which all of the first ECU 11 and a plurality of (two) second ECUs 12 are transmitting data frames. As described above, the virtual ECU does not exist and does not transmit a data frame. Therefore, when the bit communicator 35 of the last ECU having the last data frame transmission turn, among the plurality of second ECUs, has ended the transmission of the data frame, the bit communicator 35 of the first ECU 11 waits until (the number of virtual ECUs)·(waiting period) passes. The last ECU corresponds to the last communication equipment. In the example of FIG. 17, the last ECU is the second ECU 12 with an ID of 003. The first ECU 11 transmits the beacon signal after the elapse of (the number of virtual ECUs)·(waiting period). The elapse of the final period means that the period taken for waiting is equal to or longer than the final period.

When the last ECU does not transmit a data frame, the bit communicator 35 of the first ECU 11 waits until (the number of virtual ECUs)·(waiting period) passes from the elapse of the waiting period of the last ECU. The bit communicator 35 of the first ECU 11 transmits the beacon signal after the elapse of (the number of virtual ECUs)·(waiting period). Hereinafter, the period during which the first ECU 11 waits finally between two consecutive beacon signals will be referred to as a final period. The final period is (the number of virtual ECUs)·(waiting period), and corresponds to the second waiting period. The order data indicates the number of IDs (an integer) that exceeds the number of ECUs connected to the communication bus B. The number of IDs is related to the final period. The order data corresponds to period data.

Configuration of First ECU 11

Figure 18:
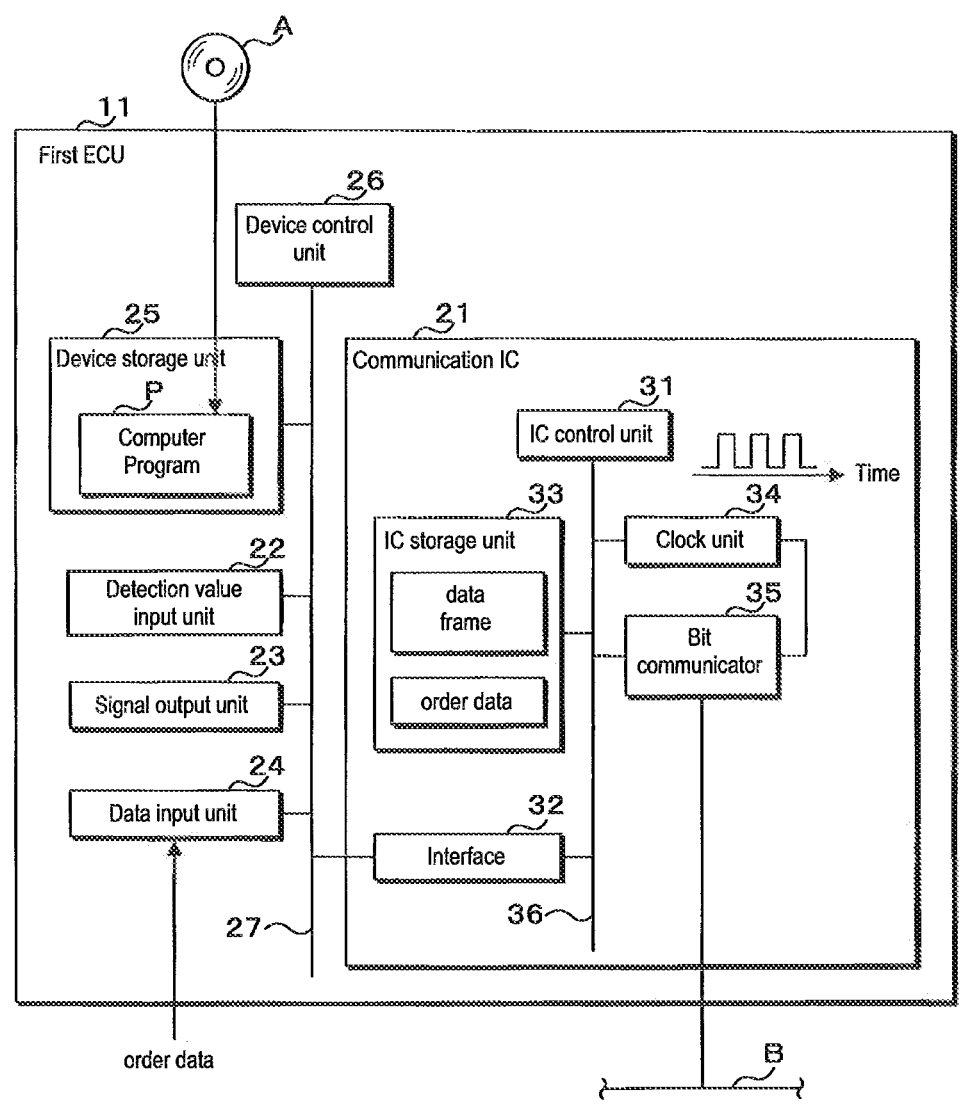
FIG. 18 is a block diagram showing the main configuration of the first ECU.

FIG. 18 is a block diagram showing the main configuration of the first ECU 11. In the first ECU 11 in the third embodiment, order data is input to the data input unit 24 from the outside. The order data is stored in the IC storage unit 33 of the communication IC 21. The device control unit 26 performs order data provision processing for providing order data to the IC control unit 31 of the communication IC 21, instead of the period calculation processing, by executing the computer program P. The IC control unit 31 performs order change processing for changing order data, instead of the waiting period change processing, by executing the computer program stored in the IC storage unit 33. If the order data is changed, the order of transmission of data frames is changed.

Configuration of Second ECU 12

Similarly to the first ECU 11, in the second ECU 12, order data is input to the data input unit 24 from the outside. The order data is stored in the IC storage unit 33 of the communication IC 21. The device control unit 26 performs order data provision processing, instead of the period calculation processing, by executing the computer program P. The IC control unit 31 performs order change processing, instead of the waiting period change processing, by executing the computer program stored in the IC storage unit 33.

Procedure for Changing Order

Figure 19:
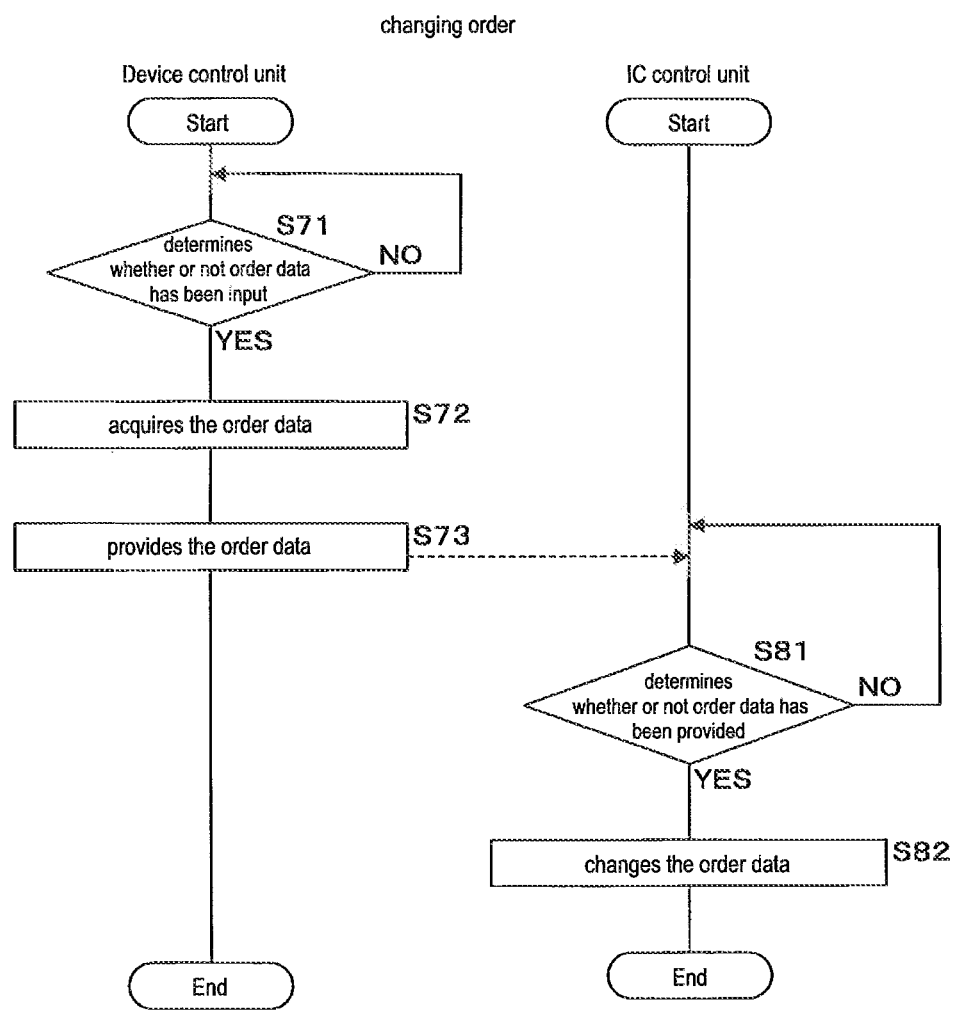
FIG. 19 is a flowchart showing a procedure for changing the order.

FIG. 19 is a flowchart showing a procedure for changing the order. In each of the first ECU 11 and the plurality of second ECUs 12, the order is changed in the same manner. FIG. 19 shows the order data provision processing of the device control unit 26 and the order change processing of the IC control unit 31.

In the order data provision processing, the device control unit 26 determines whether or not order data has been input to the data input unit 24 from the outside (step S71). When it is determined that no order data has been input to the data input unit 24 (S71: NO), the device control unit 26 executes step S71 again. Then, the device control unit 26 waits until the order data is input to the data input unit 24.

When it is determined that the order data has been input to the data input unit 24 (S71: YES), the device control unit 26 acquires the order data input from the outside to the data input unit 24 (step S72). Acquiring the order data corresponds to acquiring the order of transmission of data frames. Then, the device control unit 26 provides the order data acquired in step S72 to the IC control unit 31 through the interface 32 (step S73). After executing step S73, the device control unit 26 ends the order data provision processing. After ending the order data provision processing, the device control unit 26 performs the order data provision processing again.

In the order change processing, the IC control unit 31 determines whether or not order data has been provided from the device control unit 26 (step S81). When it is determined that no order data has been provided (S81: NO), the IC control unit 31 executes step S81 again. The IC control unit 31 waits until the order data is provided from the device control unit 26.

When it is determined that the order data has been provided (S81: YES), the IC control unit 31 changes the order data stored in the IC storage unit 33 to the provided order data (step S82), and ends the order change processing. After ending the order change processing, the IC control unit 31 performs the order change processing again.

As described above, if the order data stored in the IC storage unit 33 is changed, the number of IDs indicated by the order data, that is, the number of virtual ECUs is changed. If the number of virtual ECUs is changed, the final period is changed. Therefore, the device control unit 26 changes the final period by executing step S73. If the final period is changed, the beacon signal transmission interval is changed. The execution of step S73 corresponds to changing the final period based on the order data acquired by the device control unit 26.

As described in the description of the first embodiment, the number of ECUs connected to the communication bus B is expressed as Nd. The waiting period is expressed as Tc. In addition, the number of virtual ECUs is expressed as Nv. When the device control unit 26 has executed step S73, the final period is changed to the product of the waiting period Tc and the number of virtual ECUs Nv. The number of virtual ECUs Nv is a numerical value obtained by subtracting the number of devices Nd from the number of IDs (Nd+Nv) indicated by the order data.

Figure 20:
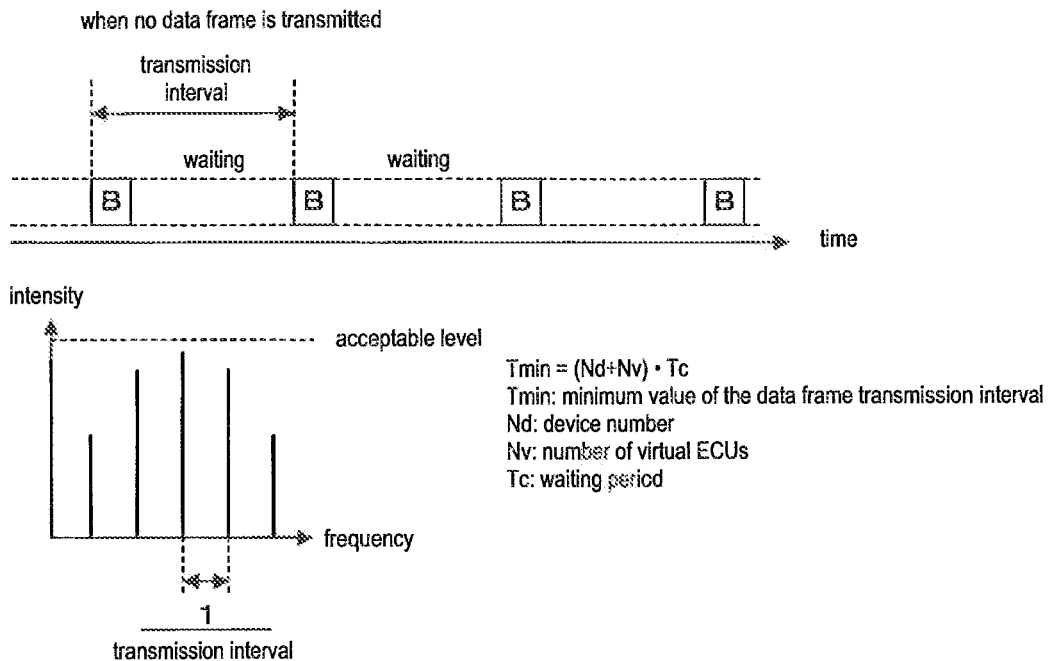
FIG. 20 is an explanatory diagram of a transmission interval when no data frame is transmitted.

FIG. 20 is an explanatory diagram of a transmission interval when no data frame is transmitted. FIG. 20 shows the transmission interval of a beacon signal and the spectrum of a signal (data) propagating through the communication bus B. In FIG. 20, the minimum value of the data frame transmission interval is expressed as Tmin.

As described in the description of the first embodiment, when no data frame is transmitted, the data frame transmission interval is the shortest and the intensity (peak value) of disturbance noise is the highest. The minimum value Tmin of the transmission interval is expressed by the following Equation.

$$Tmin = (Nd+Nv) \cdot Tc$$

The number of IDs indicated by the order data is expressed as (Nd+Nv). According to the number of IDs (integer) indicated by the order data, the minimum value Tmin of the transmission interval changes. The number of IDs indicated by the order data is preferably an integer for which the intensity of the spectrum is less than an acceptable level that is allowed as the intensity of disturbance noise. The larger the number of IDs indicated by the order data, the longer the minimum value Tmin of the transmission interval. The longer the minimum value of the transmission interval, the lower the intensity (peak value) of disturbance noise. Therefore, by increasing the number of IDs indicated by the order data, that is, the number of virtual ECUs Nv, the intensity of disturbance noise can be reduced.

The number of IDs indicated by the order data output to the data input unit 24 is preferably an integer for which the minimum value Tmin of the transmission interval is a value of 60 μs or more, for example. When the number of IDs indicated by the order data input to the data input unit 24 is an integer for which the minimum value Tmin of the transmission interval is a value of 60 μs or more, the device control unit 26 of the first ECU 11 changes the beacon signal transmission interval to the value of 60 μs or more. In addition, it is preferable that the device control unit 26 of the first ECU 11 changes the beacon signal transmission interval to a value of 60 μs or more and 6500 μs or less. For example, the upper limit of the number of IDs indicated by the order data is set such that the beacon signal transmission interval is 6500 μs or less.

Effects of Communication System 1

Each of the first ECU 11 and the plurality of second ECUs 12 has the same effects as in the first embodiment.

Fourth Embodiment

In the third embodiment, the data input to the data input unit 24 is order data. However, the data input to the data input unit 24 is not limited to the order data.

Hereinafter, the points of a fourth embodiment that are different from the third embodiment will be described. Since configurations other than those described later are the same as those of the third embodiment, the same components as in the third embodiment are denoted by the same reference numerals as in the third embodiment, and the description thereof will be omitted.

Configuration of Communication System 1

Figure 21:
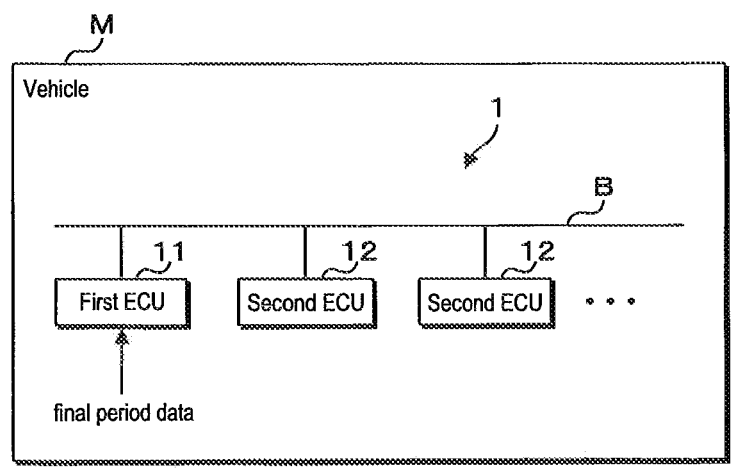
FIG. 21 is a block diagram showing the main configuration of a communication system according to a fourth embodiment.

FIG. 21 is a block diagram showing the main configuration of a communication system 1 according to the fourth embodiment. In the communication system 1 according to the second embodiment, instead of the order data, final period data indicating a final period is input to the data input unit 24 of the first ECU 11. Common order data that does not include the ID of the virtual ECU is stored in the IC storage unit 33 of each of the first ECU 11 and the plurality of second ECUs 12.

The final period data indicating the final period is stored in the IC storage unit 33 of the first ECU 11. When the last ECU having a last turn among the plurality of second ECUs 12 transmits a data frame, the bit communicator 35 of the first ECU 11 transmits a beacon signal after the elapse of the final period indicated by the final period data when the last ECU ends the transmission of the data frame. When the last ECU does not transmit a data frame, the bit communicator 35 transmits the beacon signal after the elapse of the final period indicated by the final period data when the waiting period of the last ECU passes.

Configuration of First ECU 11

In the fourth embodiment, the device control unit 26 of the first ECU 11 performs final period data provision processing for providing the final period data to the IC control unit 31, instead of the order data provision processing, by executing the computer program P. The IC control unit 31 of the first ECU 11 performs final period change processing for changing the final period data stored in the IC storage unit 33 by executing the computer program stored in the IC storage unit 33.

Procedure for Changing Final Period

Figure 22:
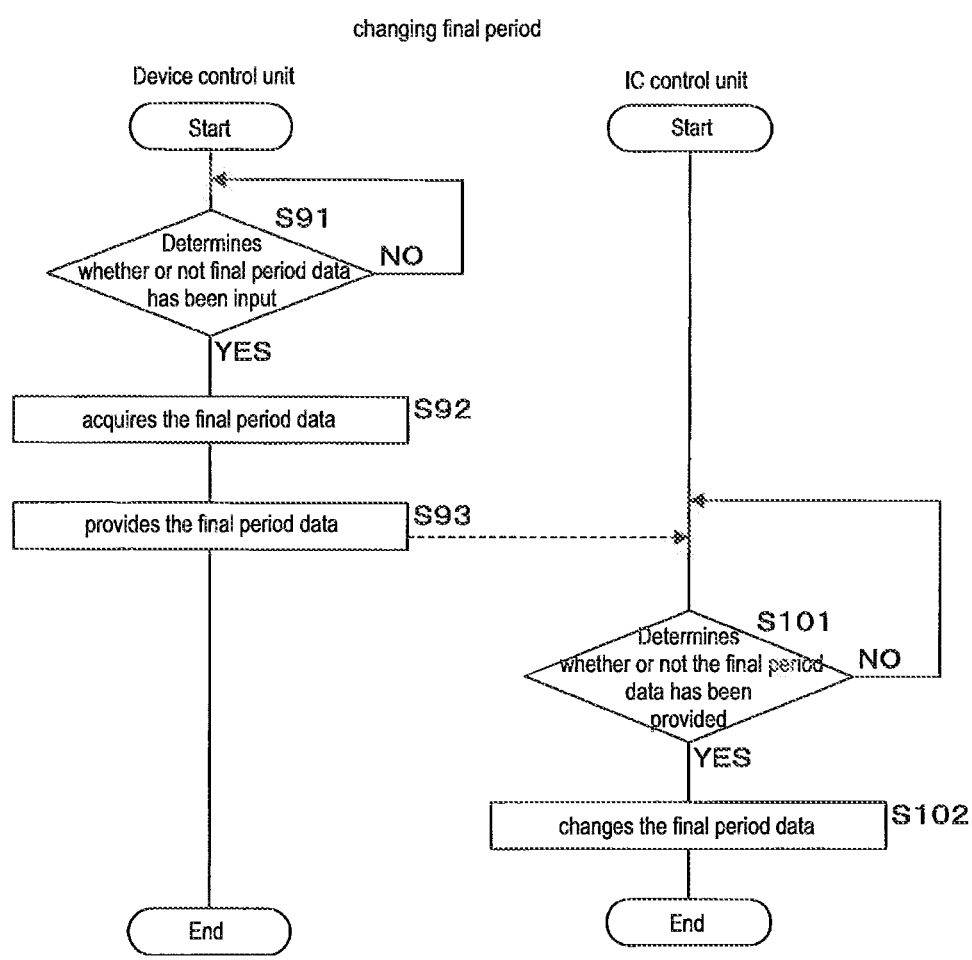
FIG. 22 is a flowchart showing a procedure for changing final period data.

FIG. 22 is a flowchart showing a procedure for changing the final period. FIG. 22 shows the final period data provision processing of the device control unit 26 and the final period change processing of the IC control unit 31.

In the final period data provision processing, the device control unit 26 determines whether or not final period data has been input to the data input unit 24 from the outside (step S91). When it is determined that no final period data has been input to the data input unit 24 (S91: NO), the device control unit 26 executes step S91 again. Then, the device control unit 26 waits until the final period data is input to the data input unit 24.

When it is determined that the final period data has been input to the data input unit 24 (S91: YES), the device control unit 26 acquires the final period data input to the data input unit 24 from the outside (step S92). Acquiring the final period data corresponds to acquiring the final period. Then, the device control unit 26 provides the final period data acquired in step S92 to the IC control unit 31 through the interface 32 (step S93). After executing step S93, the device control unit 26 ends the final period data provision processing. After ending the final period data provision processing, the device control unit 26 performs the final period data provision processing again.

In the final period change processing, the IC control unit 31 determines whether or not the final period data has been provided from the device control unit 26 (step S101). When it is determined that no final period data has been provided (S101: NO), the IC control unit 31 executes step S101 again. The IC control unit 31 waits until the final period data is provided from the device control unit 26.

When it is determined that the final period data has been provided (S101: YES), the IC control unit 31 changes the final period data stored in the IC storage unit 33 to the provided final period data (step S102), and ends the final period change processing. After ending the final period change processing, the IC control unit 31 performs the order change processing again.

As described above, if the final period data stored in the IC storage unit 33 is changed, the final period is changed. Therefore, the device control unit 26 changes the final period by executing step S93. If the final period is changed, the beacon signal transmission interval is changed.

The final period indicated by the final period data output to the data input unit 24 is preferably a period in which the minimum value Tmin of the transmission interval is a value of 60 μs or more, for example. When the number of IDs indicated by the final period data input to the data input unit 24 is a period in which the minimum value Tmin of the transmission interval is a value of 60 μs or more, the device control unit 26 of the first ECU 11 changes the beacon signal transmission interval to the value of 60 μs or more. In addition, it is preferable that the device control unit 26 of the first ECU 11 changes the beacon signal transmission interval to a value of 60 μs or more and 6500 μs or less. For example, the upper limit of the final period indicated by the final period data is set according to the number of devices so that the beacon signal transmission interval is 6500 μs or less.

Effects of Communication System 1

Each of the first ECU 11 and the plurality of second ECUs 12 has the same effects as in the third embodiment.

Modification Examples of Third and Fourth Embodiments

In each of the third and fourth embodiments, at least one of the first ECU 11 and the plurality of second ECUs 12 may change the waiting period as in the first or second embodiment. In this case, one or more waiting periods and the final period are changed such that the beacon signal transmission interval is, for example, a value of 60 μs or more and 6500 μs or less. In the third embodiment, for the transmission of data frames, the turn of the virtual ECU is not limited to after the turn of the last ECU. The turn of the virtual ECU may be, for example, between the turns of the second and last ECUs. In this case, the waiting period of the second ECU 12 that transmits the data frame after the virtual ECU is extended. In addition, when the number of virtual ECUs is 2 or more, some virtual ECUs may be arranged between the turns of the second and last ECUs, and the remaining virtual ECUs may be arranged after the last ECU.

Modification Examples of First to Fourth Embodiments

In each of the first ECU 11 and the plurality of second ECUs 12 in the first to fourth embodiments, some or all of the processes performed by the IC control unit 31 may be performed by the device control unit 26. In addition, in each of the first to fourth embodiments, some or all of the processes performed by the device control unit 26 may be performed by the IC control unit 31. In addition, the transmission of data frames is not limited to transmission according to the PLCA method. There is no problem as long as the data frame transmission method is a method in which the first ECU 11 and the plurality of second ECUs 12 transmit data frames in order after the beacon signal is transmitted. In addition, devices connected to the communication bus B are not limited to ECUs. There is no problem as long as the device connected to the communication bus B is a communication device that transmits data through the communication bus B.

The method of grasping the timing at which the transmission of the data frame ends is not limited to the method based on the data length. When an EOF field indicating the end of transmission is provided at the end of the data frame, the timing at which the transmission of the EOF field ends is the timing at which the transmission of the data frame ends. EOF is an abbreviation for End Of Frame. The waveform of the EOF field is determined in advance.

The technical features (configuration requirements) described in the first to fourth embodiments can be combined with each other, and new technical features can be formed by combining these.

It should be considered that the first to fourth embodiments disclosed are examples in all points and not restrictive. The scope of the present disclosure is defined by the claims rather than the meanings set forth above, and is intended to include all modifications within the scope and meaning equivalent to the claims.

The invention claimed is:

1. A communication device, comprising:
a data transmission unit that is to be connected to a communication bus to which a plurality of communication equipment is connected and transmits data; and
a processing unit that performs processing,
wherein an order in which the plurality of pieces of communication equipment and the data transmission unit transmit data through the communication bus is determined in advance,
a start signal indicating a start of data transmission is repeatedly transmitted through the communication bus,
the data transmission unit transmits data according to the order when the start signal is transmitted, and
the processing unit changes a transmission interval of the start signal,
wherein the data transmission unit waits when a data transmission turn comes,
the data transmission unit starts data transmission when a period taken for waiting is equal to or longer than a waiting period,
the transmission interval of the start signal increases as the waiting period increases, and
the processing unit changes the transmission interval of the start signal by changing the waiting period and the processing unit acquires the number of devices connected to the communication bus from an outside, and changes the waiting period based on the acquired number of devices.

2. The communication device according to claim 1, further comprising:
a signal transmission unit that transmits the start signal through the communication bus,
wherein the signal transmission unit waits when last communication equipment having a last data transmission turn, among the plurality of pieces of communication equipment, ends data transmission or when the last communication equipment does not transmit data,
the signal transmission unit transmits the start signal again when a period taken for waiting is equal to or longer than a second waiting period, and
the processing unit changes the transmission interval of the start signal by changing the second waiting period.

3. The communication device according to claim 2,
wherein the processing unit acquires period data regarding the second waiting period from an outside, and changes the second waiting period based on the acquired period data.

4. The communication device according to claim 3,
wherein the data transmission unit starts data transmission after elapse of a waiting period when the signal transmission unit ends transmission of the start signal, and
the processing unit acquires the period data indicating an integer exceeding the number of devices connected to the communication bus, and changes the second waiting period to a product of the waiting period and a numerical value obtained by subtracting the number of devices from the integer indicated by the period data.

5. The communication device according to claim 4,
wherein a configuration of the data transmission unit conforms to 10BASE-T1S of IEEE802.3cg.

6. The communication device according to claim 3,
wherein a configuration of the data transmission unit conforms to 10BASE-T1S of IEEE802.3cg.

7. The communication device according to claim 2,
wherein a configuration of the data transmission unit conforms to 10BASE-T1S of IEEE802.3cg.

8. The communication device according to claim 1,
wherein a configuration of the data transmission unit conforms to 10BASE-T1S of IEEE802.3cg.

9. The communication device according to claim 1, further comprising:
a signal transmission unit that transmits the start signal through the communication bus,
wherein the signal transmission unit waits when last communication equipment having a last data transmission turn, among the plurality of pieces of communication equipment, ends data transmission or when the last communication equipment does not transmit data,
the signal transmission unit transmits the start signal again when a period taken for waiting is equal to or longer than a second waiting period, and
the processing unit changes the transmission interval of the start signal by changing the second waiting period.

10. The communication device according to claim 1,
wherein a configuration of the data transmission unit conforms to 10BASE-T1S of IEEE802.3cg.

11. A communication system, comprising:
a plurality of communication devices connected to a communication bus,
wherein one of the plurality of communication devices has a signal transmission unit that repeatedly transmits a start signal indicating a start of data transmission through the communication bus,
each of the plurality of communication devices includes a data transmission unit that transmits data through the communication bus according to a predetermined order when the start signal is transmitted, at least one of the plurality of communication devices further includes a processing unit that performs processing, and the processing unit changes a transmission interval of the start signal, wherein the data transmission unit waits when a data transmission turn comes, the data transmission unit starts data transmission when a period taken for waiting is equal to or longer than a waiting period, the transmission interval of the start signal increases as the waiting period increases, and the processing unit changes the transmission interval of the start signal by changing the waiting period and the processing unit acquires the number of devices connected to the communication bus from an outside, and changes the waiting period based on the acquired number of devices.

12. The communication system according to claim 11, wherein the one or more processing units collectively change the transmission interval of the start signal to a value of 60 us or more.

13. The communication system according to claim 12, wherein the one or more processing units collectively change the transmission interval of the start signal to a value of 6500 us or less.

14. A communication method of a communication device for transmitting data, wherein the communication device is connected to a communication bus to which a plurality of communication equipments are connected, an order in which the communication device and the plurality of pieces of communication equipment transmit data through the communication bus is determined in advance, a start signal indicating a start of data transmission is repeatedly transmitted through the communication bus, and the communication device executes:

a step of transmitting data according to the order when the start signal is transmitted; and a step of changing a transmission interval of the start signal;

waiting for when a data transmission turn comes; tarting a data transmission when a period taken for waiting is equal to or longer than a waiting period, the transmission interval of the increasing the transmission interval of the start signal as the waiting period increases;

changing the transmission interval of the start signal by changing the waiting period; acquiring the number of devices connected to the communication bus from an outside, and changing the waiting period based on the acquired number of devices.

15. A computer program product for use with a communication device connected to a plurality of communication equipment by a communication bus, the computer program product including a non-transitory, machine-readable medium storing instructions which, when executed by at least one programmable processor, caused at least one programmable processor to perform operations comprising:

transmitting data from the communication device to the plurality of communication equipment along the bus, determining an order in which the communication device and the plurality of pieces of communication equipment transmit data through the communication bus in advance of the transmission, generating a start signal indicating a start of data transmission that is repeatedly transmitted through the communication bus, and transmitting data according to the order when the start signal is transmitted;

changing a transmission interval of the start signal;

waiting for when a data transmission turn comes; tarting a data transmission when a period taken for waiting is equal to or longer than a waiting period, the transmission interval of the increasing the transmission interval of the start signal as the waiting period increases;

changing the transmission interval of the start signal by changing the waiting period;

acquiring the number of devices connected to the communication bus from an outside, and changing the waiting period based on the acquired number of devices.

* * * * *